United States Patent
Watanabe et al.

(10) Patent No.: US 10,530,950 B2
(45) Date of Patent: Jan. 7, 2020

(54) SHEET CONVEYING DEVICE, IMAGE FORMING APPARATUS INCORPORATING THE SHEET CONVEYING DEVICE, AND POST PROCESSING DEVICE INCORPORATING THE SHEET CONVEYING DEVICE

(71) Applicants: Takeshi Watanabe, Miyagi (JP);
Tetsuo Watanabe, Kanagawa (JP);
Katsuaki Miyawaki, Kanagawa (JP);
Jun Yamane, Kanagawa (JP);
Hiromichi Matsuda, Kanagawa (JP);
Hideyuki Takayama, Kanagawa (JP);
Daiki Sekita, Kanagawa (JP)

(72) Inventors: Takeshi Watanabe, Miyagi (JP);
Tetsuo Watanabe, Kanagawa (JP);
Katsuaki Miyawaki, Kanagawa (JP);
Jun Yamane, Kanagawa (JP);
Hiromichi Matsuda, Kanagawa (JP);
Hideyuki Takayama, Kanagawa (JP);
Daiki Sekita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/899,479

(22) Filed: Feb. 20, 2018

(65) Prior Publication Data
US 2018/0241896 A1 Aug. 23, 2018

(30) Foreign Application Priority Data
Feb. 22, 2017 (JP) .................................. 2017-030944
Feb. 1, 2018 (JP) .................................. 2018-016421

(51) Int. Cl.
*H04N 1/00* (2006.01)
*G03G 15/00* (2006.01)
(Continued)

(52) U.S. Cl.
CPC .......... *H04N 1/00602* (2013.01); *B65H 5/06* (2013.01); *G03G 15/0208* (2013.01); *G03G 15/6555* (2013.01)

(58) Field of Classification Search
None
See application file for complete search history.

(56) References Cited

U.S. PATENT DOCUMENTS 6,650,865 B2 * 11/2003 Quesnel ................. B65H 9/006
399/388
6,733,006 B2 * 5/2004 Kobayashi ............. B65H 33/06
270/32
(Continued)

FOREIGN PATENT DOCUMENTS

JP 6-234441 8/1994
JP 9-175694 7/1997
(Continued)

*Primary Examiner* — Paul F Payer
(74) *Attorney, Agent, or Firm* — Harness, Dickey and Pierce, P.L.C.

(57) ABSTRACT

A sheet conveying device, which is included in an image forming apparatus and a post processing device, includes a position corrector and either one of a rolling body and a contact resistance reducer. The position corrector is configured to convey a sheet and correct a position of the sheet. The rolling body is disposed at least one of an upstream side and a downstream side of a sheet conveyance passage from the position corrector in a sheet conveying direction and is configured to roll in at least a direction intersecting the sheet conveying direction. The contact resistance reducer is configured to reduce contact resistance generated due to contact of the sheet to a neighboring part when the position of the sheet is corrected by the position corrector.

20 Claims, 22 Drawing Sheets

(51) Int. Cl.
    *G03G 15/02*     (2006.01)
    *B65H 5/06*     (2006.01)

(56) References Cited

U.S. PATENT DOCUMENTS

| | | | | |
|---|---|---|---|---|
| 7,195,238 B2* | 3/2007 | Suga | ............ | B65H 9/002 |
| | | | | 271/227 |
| 7,422,209 B2* | 9/2008 | Hashimoto | ............ | B65H 9/002 |
| | | | | 271/228 |
| 7,862,015 B2* | 1/2011 | Kotani | ............ | B65H 31/26 |
| | | | | 270/20.1 |
| 7,900,914 B2* | 3/2011 | Fujita | ............ | B65H 5/38 |
| | | | | 271/248 |
| 7,938,399 B2* | 5/2011 | Kawaguchi | ............ | B65H 5/38 |
| | | | | 271/227 |
| 8,002,275 B2* | 8/2011 | Hayakawa | ............ | B65H 7/06 |
| | | | | 271/226 |
| 2016/0159598 A1* | 6/2016 | Yamane | ............ | B65H 9/002 |
| | | | | 271/227 |

FOREIGN PATENT DOCUMENTS

| | | |
|---|---|---|
| JP | 10-067448 | 3/1998 |
| JP | 10-120253 | 5/1998 |
| JP | 2003-020137 | 1/2003 |
| JP | 2003-118890 | 4/2003 |
| JP | 2004-338215 | 12/2004 |
| JP | 2005-035709 | 2/2005 |
| JP | 2005-041603 | 2/2005 |
| JP | 2005-041604 | 2/2005 |
| JP | 2005-053646 | 3/2005 |
| JP | 2005-178929 | 7/2005 |
| JP | 2006-027859 | 2/2006 |
| JP | 2007-022806 | 2/2007 |
| JP | 2007-097329 | 4/2007 |
| JP | 2007-269421 | 10/2007 |
| JP | 2008-137739 | 6/2008 |
| JP | 2008-230837 | 10/2008 |
| JP | 2008-239348 | 10/2008 |
| JP | 2009-073181 | 4/2009 |
| JP | 2009-132468 | 6/2009 |
| JP | 2011-098790 | 5/2011 |
| JP | 2011-121739 | 6/2011 |
| JP | 2014-058369 | 4/2014 |
| JP | 2014-088263 | 5/2014 |
| JP | 2014-137395 | 7/2014 |
| JP | 2014-193769 | 10/2014 |
| JP | 2015-087454 | 5/2015 |
| JP | 2016-024546 | 2/2016 |
| JP | 2016-044067 | 4/2016 |
| JP | 2016-088702 | 5/2016 |
| JP | 2016-175776 | 10/2016 |
| JP | 2016-188142 | 11/2016 |

\* cited by examiner

SHEET CONVEYING DEVICE, IMAGE FORMING APPARATUS INCORPORATING THE SHEET CONVEYING DEVICE, AND POST PROCESSING DEVICE INCORPORATING THE SHEET CONVEYING DEVICE

CROSS-REFERENCE TO RELATED APPLICATIONS

This patent application is based on and claims priority pursuant to 35 U.S.C. § 119(a) to Japanese Patent Application Nos. 2017-030944, filed on Feb. 22, 2017, and 2018-016421, filed on Feb. 1, 2018, in the Japan Patent Office, the entire disclosure of each of which is hereby incorporated by reference herein.

BACKGROUND

Technical Field

This disclosure relates to a sheet conveying device that conveys a sheet, an image forming apparatus including the sheet conveying device, and a post processing device including the sheet conveying device.

Related Art

Various kinds of image forming apparatuses such as copiers and printers employ a technique, for example, to detect an angular displacement amount and a lateral displacement amount of the sheet in conveyance of a sheet such as a paper material and an OHP (overhead projector) film sheet and to correct the position of the sheet to a correct position.

Known sheet conveying devices that perform correction of a sheet position includes a sheet conveying device that corrects the position of a sheet by causing a pair of sheet holding rollers that holds the sheet to rotate and shift in the axial direction.

SUMMARY

At least one aspect of this disclosure provides a sheet conveying device including a position corrector configured to convey a sheet and correct a position of the sheet, and a rolling body disposed at least one of an upstream side and a downstream side of a sheet conveyance passage from the position corrector in a sheet conveying direction and configured to roll in at least a direction intersecting the sheet conveying direction.

Further, at least one aspect of this disclosure provides an image forming apparatus including the above-described sheet conveying device.

Further, at least one aspect of this disclosure provides a post processing device including the above-described sheet conveying device.

Further, at least one aspect of this disclosure provides a sheet conveying device including a position corrector configured to convey a sheet and correct a position of the sheet, and a contact resistance reducer configured to reduce contact resistance generated due to contact of the sheet to a neighboring part when the position of the sheet is corrected by the position corrector.

Further, at least one aspect of this disclosure provides an image forming apparatus including the above-described sheet conveying device.

Further, at least one aspect of this disclosure provides a post processing device including the above-described sheet conveying device.

BRIEF DESCRIPTION OF THE SEVERAL VIEWS OF THE DRAWINGS

An exemplary embodiment of this disclosure will be described in detail based on the following figured, wherein.

DETAILED DESCRIPTION

Figure 1:
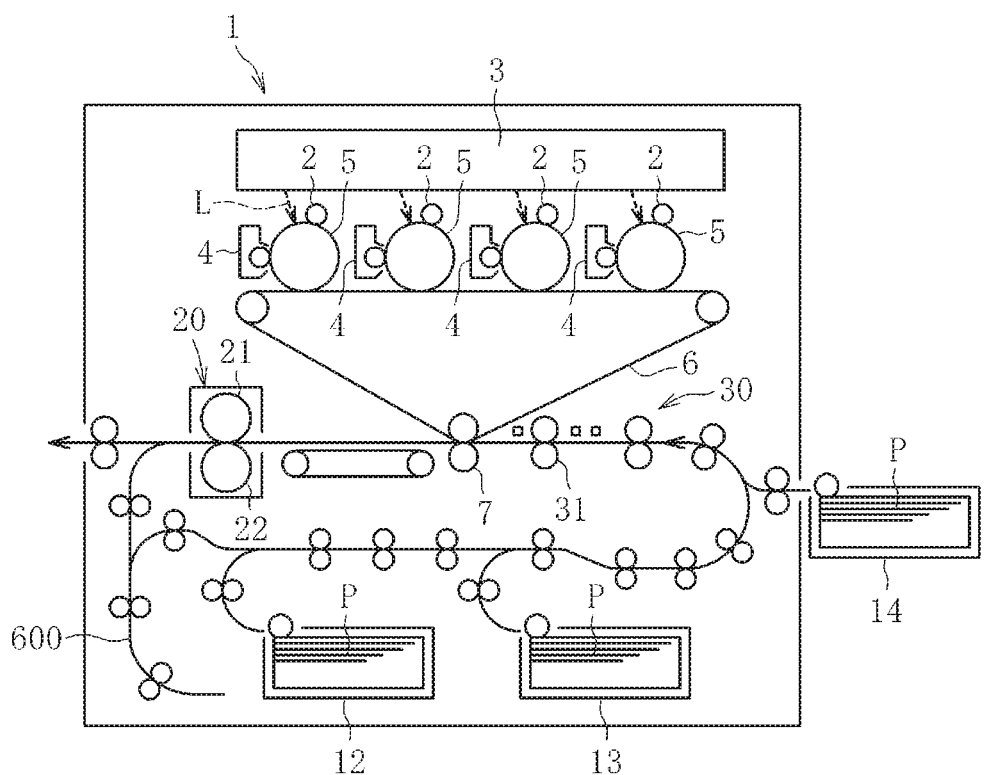
FIG. 1 is a schematic diagram illustrating an entire configuration of an image forming apparatus according to an embodiment of this disclosure.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used to distinguish one element, component, region, layer or section from another region, layer or section. Thus, a first element, component, region, layer or section discussed below could be termed a second element, component, region, layer or section without departing from the teachings of the present disclosure.

The terminology used herein is for describing particular embodiments and examples and is not intended to be limiting of exemplary embodiments of this disclosure. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Descriptions are given, with reference to the accompanying drawings, of examples, exemplary embodiments, modification of exemplary embodiments, etc., of an image forming apparatus according to exemplary embodiments of this disclosure. Elements having the same functions and shapes are denoted by the same reference numerals throughout the specification and redundant descriptions are omitted. Elements that do not demand descriptions may be omitted from the drawings as a matter of convenience. Reference numerals of elements extracted from the patent publications are in parentheses so as to be distinguished from those of exemplary embodiments of this disclosure.

This disclosure is applicable to any image forming apparatus, and is implemented in the most effective manner in an electrophotographic image forming apparatus.

In describing preferred embodiments illustrated in the drawings, specific terminology is employed for the sake of clarity. However, the disclosure of this disclosure is not intended to be limited to the specific terminology so selected and it is to be understood that each specific element includes any and all technical equivalents that have the same function, operate in a similar manner, and achieve a similar result.

Referring now to the drawings, wherein like reference numerals designate identical or corresponding parts throughout the several views, preferred embodiments of this disclosure are described.

Descriptions are given of an example applicable to a sheet conveying device, an image forming apparatus incorporating the sheet conveying device, and a sheet processing device incorporating the sheet conveying device. It is to be noted that elements (for example, mechanical parts and components) having the same functions and shapes are denoted by the same reference numerals throughout the specification and redundant descriptions are omitted.

First, referring to FIG. 1, a description is given of a configuration and functions of the image forming apparatus 1 according to an embodiment of this disclosure, with reference to FIG. 1.

The image forming apparatus 1 may be a copier, a facsimile machine, a printer, a multifunction peripheral or a multifunction printer (MFP) having at least one of copying, printing, scanning, facsimile, and plotter functions, or the like. According to the present example, the image forming apparatus 1 is an electrophotographic copier that forms toner images on recording media by electrophotography.

It is to be noted in the following examples that: the term "image forming apparatus" indicates an apparatus in which an image is formed on a recording medium such as paper, OHP (overhead projector) transparencies, OHP film sheet, thread, fiber, fabric, leather, metal, plastic, glass, wood, and/or ceramic by attracting developer or ink thereto; the term "image formation" indicates an action for providing (i.e., printing) not only an image having meanings such as texts and figures on a recording medium but also an image having no meaning such as patterns on a recording medium; and the term "sheet" is not limited to indicate a paper material but also includes the above-described plastic material (e.g., a OHP sheet), a fabric sheet and so forth, and is used to which the developer or ink is attracted. In addition, the "sheet" is not limited to a flexible sheet but is applicable to a rigid plate-shaped sheet and a relatively thick sheet.

Further, size (dimension), material, shape, and relative positions used to describe each of the components and units are examples, and the scope of this disclosure is not limited thereto unless otherwise specified.

Further, it is to be noted in the following examples that: the term "sheet conveying direction" indicates a direction in which a recording medium travels from an upstream side of a sheet conveying path to a downstream side thereof; the term "width direction" indicates a direction basically perpendicular to the sheet conveying direction.

In FIG. 1, the image forming apparatus 1 includes charging units 2, an exposure device 3, image forming devices 4, multiple (four, in this case) photoconductors 5, a primary transfer portion (an intermediate transfer belt) 6, a secondary transfer portion (a secondary transfer roller) 7, a first sheet feeding unit 12, a second sheet feeding unit 13, a third sheet feeding unit 14, a fixing device 20, a fixing roller 21, a pressure roller 22, a sheet conveying device 30, and a pair of sheet holding rollers 31.

The charging units 2 uniformly charge respective surfaces of the multiple photoconductors 5.

The exposure device 3 emits respective exposure lights L to the respective surfaces of the photoconductors 5.

The developing devices 4 form a toner image (an image) on the respective surfaces of the multiple photoconductors 5.

The primary transfer portion (the intermediate transfer belt) 6 is a portion onto which the toner image formed on each of the multiple photoconductors 5 is primarily transferred.

The secondary transfer portion (the secondary transfer roller) 7 is a portion to transfer the toner image from the primarily transfer portion 6 to a sheet P.

The first sheet feeding unit 12, the second sheet feeding unit 13, and the third sheet feeding unit 14 are sheet feeding portions (sheet trays), each of which contains the sheet P therein.

The fixing device 20 includes the fixing roller 21 and the pressure roller 22 to fix an unfixed image formed on the sheet P to the sheet P by application of heat by the fixing roller 21 and pressure by the pressure roller 22.

The sheet conveying device 30 conveys the sheet P through a sheet conveyance passage.

The pair of sheet holding rollers 31 functions as a pair of correction rollers to correct the attitude and position of the sheet P while conveying the sheet P. In addition to the above-described function as a pair of correction rollers, the pair of sheet holding rollers 31 may also function as a pair of timing rollers to adjust a timing of conveyance (i.e., change a conveying speed) of the sheet P to the secondary transfer portion 7. Further, another pair of timing rollers may be disposed downstream from the pair of sheet holding rollers 31 in the sheet conveying direction.

Figure 2:
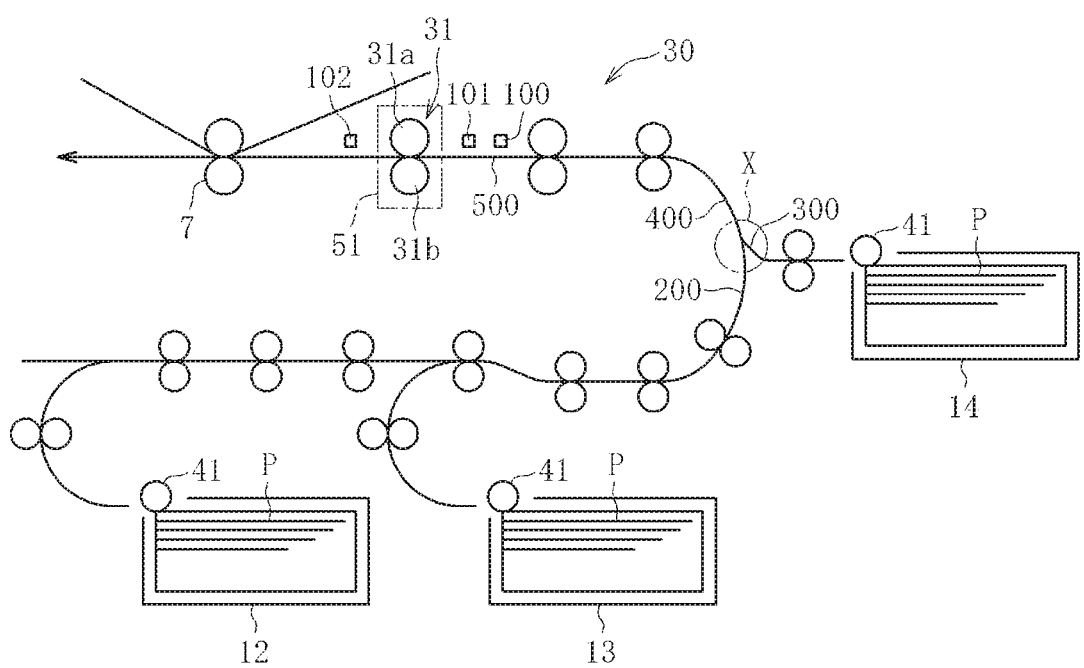
FIG. 2 is a schematic diagram illustrating a pair of sheet holding rollers and parts and units disposed near the pair of sheet holding rollers.

A description is given of regular image forming operations performed in the image forming apparatus 1 according to an embodiment of this disclosure, with reference to FIGS. 1 and 2.

FIG. 2 is a schematic diagram illustrating the pair of sheet holding rollers 31 and parts and units disposed near the pair of sheet holding rollers 31.

The charging units 2 uniformly charge the respective surfaces of the multiple photoconductors 5 to a predetermined polarity (a charging process).

Then, based on image data of an original document read by an image reading device or a computer, the exposure device 3 emits laser light L onto the respective charged surfaces of the multiple photoconductors 5 to irradiate the respective surfaces of the photoconductors 5 so as to form respective electrostatic latent images on the respective surfaces of the photoconductors 5 (an exposing process).

The developing devices 4 supply toner onto the respective surfaces of the photoconductors 5 with different colors (for example, yellow, magenta, cyan and black 9 so that the respective electrostatic latent images formed on the respective surfaces of the photoconductors 5 are developed into respective visible toner images (a developing process).

Then, the respective toner images formed on the respective surfaces of the photoconductors 5 are primarily transferred one on another in layers onto the primarily transfer portion 6 to form a composite color image. Thereafter, the composite color image is secondarily transferred onto the sheet P by the secondary transfer portion 7.

The sheet P is conveyed manually or automatically from a selected one of the first sheet feeding unit 12, the second sheet feeding unit 13 and the third sheet feeding unit 14. For example, when one of the first sheet feeding unit 12 and the second sheet feeding unit 13 disposed inside an apparatus body of the image forming apparatus 1 is selected, the sheet P stored in the selected one of the first sheet feeding unit 12 and the second sheet feeding unit 13 is fed by a sheet feed roller 41 toward a first curved portion 200 of a sheet conveyance passage, as illustrated in FIG. 2. By contrast, when the third sheet feeding unit 14 disposed outside the apparatus body of the image forming apparatus 1 is selected, the sheet P stored in the third sheet feeding unit 14 is fed by the sheet feed roller 41 toward a second curved portion 300 of the sheet conveyance passage, as illustrated in FIG. 2. The first curved portion 200 and the second curved portion 300 meet at a meeting point X to continuously extend to a third curved portion 400. Therefore, the sheet P fed from any one of the first sheet feeding unit 12, the second sheet feeding unit 13 and the third sheet feeding unit 14 passes the meeting point X to enter the third curved portion 400. Thereafter, the sheet P passes through a straight sheet conveyance passage 500 and reaches the position of the pair of sheet holding rollers 31 that forms an alignment unit 51. Then, the pair of sheet holding rollers 31 corrects the position of the sheet P in the width direction and the rotational direction based on the lateral displacement and the angular displacement, respectively, and conveys the sheet P toward the secondary transfer portion 7.

After the toner image is transferred onto the sheet P at the secondary transfer portion 7, the sheet P is conveyed to the fixing device 20. The sheet P that has been conveyed to the fixing device 20 is sent and held between the fixing roller 21 and the pressure roller 22. Thus, the unfixed toner image on the sheet P is fixed to the sheet P by application of apply and pressure. Consequently, the sheet P is discharged from the image forming apparatus 1.

When a duplex printing mode in which respective images are printed both sides (i.e., a front side and a back side) of the sheet P is selected, a toner image after completion of the charging process, the exposing process and the developing process is transferred onto one side (e.g., the front side) of the sheet P. However, the sheet P is not discharged after the fixing process but is guided to a sheet reverse conveyance passage 600, as illustrated in FIG. 1. The sheet P conveyed to the sheet reverse conveyance passage 600 is switched back (the direction of conveyance of the sheet P is reversed) in the sheet reverse conveyance passage 600, and then is conveyed to the secondary transfer portion 7 again via the first curved portion 200, the third curved portion 400 and the straight sheet conveyance passage 500. Then, a toner image after completion of the charging process, the exposing process and the developing process is transferred onto the other side (e.g., the back side) of the sheet P. At this time, the sheet P is discharged from the image forming apparatus 1 after the fixing process by the fixing device 20.

A series of image forming processes is described above. However, in addition to the above-described image forming operation, the image forming apparatus 1 can form a single color image by any one of the photoconductors 5, or form a composite color image of two or three colors by any two or three of the photoconductors 5.

Next, a description is given of the sheet conveying device 30 according to the present embodiment of this disclosure.

It is to be noted that, hereinafter, "an upstream side in the sheet conveying direction" of the sheet conveyance passage is referred to simply as "an upstream side", "a downstream side in the sheet conveying direction" of the sheet conveyance passage is referred to simply as "a downstream side."

Figure 3A:
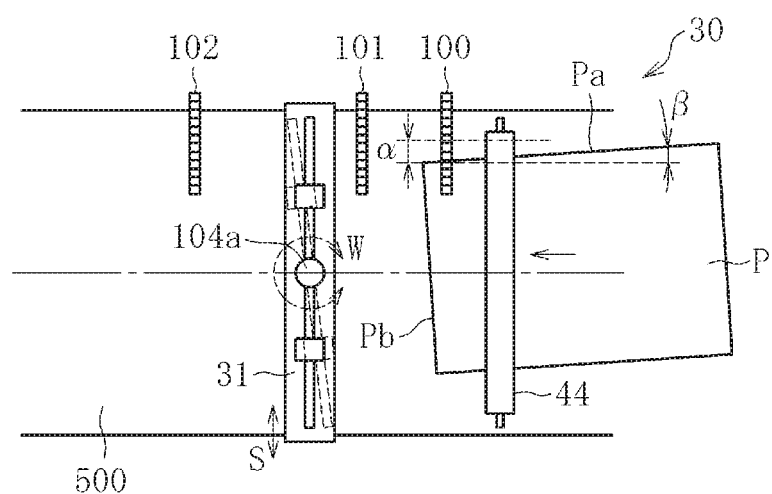
FIG. 3A is a plan view illustrating a schematic diagram of the pair of sheet holding rollers and parts and units disposed near the pair of sheet holding rollers.
Figure 3B:
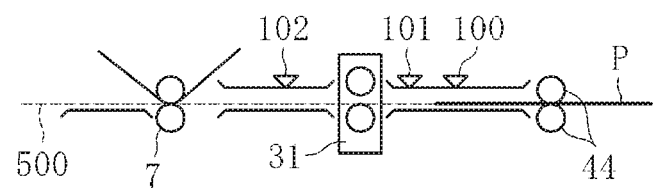
FIG. 3B is a side view illustrating a schematic diagram.

FIG. 3A is a plan view illustrating a schematic diagram of the pair of sheet holding rollers 31 and parts and units disposed near the pair of sheet holding rollers 31. FIG. 3B is a side view of FIG. 3A.

As illustrated in FIGS. 3A and 3B, the sheet conveying device 30 includes multiple CISs 100, 101 and 102 and the pair of sheet holding rollers 31. Each of the multiple CISs 100, 101 and 102 functions as a position detector to detect the position of the sheet P. The pair of sheet holding rollers 31 functions as a sheet conveyor to convey the sheet P as well as a position corrector to correct the position of the sheet P. The multiple CISs 100, 101 and 102 are referred to as a "first CIS 100" that functions as a first position detector, a "second CIS 101" that functions as a second position detector and a "third CIS 102" that functions as a third position detector, in this order from the upstream side (i.e., the right side of FIG. 2) of the straight sheet conveyance passage 500. The first CIS 100 and the second CIS 101 are disposed at the upstream side from the pair of sheet holding rollers 31 and at the downstream side from the pair of sheet conveying rollers 44 that functions as a sheet conveyor that is disposed at one upstream position from the pair of sheet holding rollers 31. By contrast, the third CIS 102 is disposed at the downstream side from the pair of sheet holding rollers 31 and at the upstream side from the secondary transfer portion 7, as illustrated in FIG. 3B. The first CIS 100, the second CIS 101 and the third CIS 102 are disposed parallel to each other relative to the width direction of the sheet P (i.e., a direction perpendicular to the sheet conveying direction). At the same time, the relative positions to the sheet conveying direction and the positional relation to parts and units disposed in the vicinity of the pair of sheet holding rollers 31 are previously determined.

The "CIS" stands for a contact image sensor that contributes to a reduction in size of a device in recent years. The CIS uses small-size LEDs (light emitting diodes) as a light source to directly read an image by linear sensors via lenses. Each of the first CIS 100, the second CIS 101 and the third CIS 102 includes multiple line sensors aligned in the width direction of the sheet P so as to detect a side edge Pa of one end side in the width direction of the sheet P, as illustrated in FIG. 3A.

It is to be noted that the position detector is not limited to a CIS but may be any detector such as photosensors disposed along the width direction of the sheet P as long as the detector detects the side edge Pa of a sheet P.

The pair of sheet holding rollers 31 functions as the alignment unit 51 to perform alignment of lateral correction (i.e., correction to a lateral displacement a of the sheet P illustrated in FIG. 3A) and angular correction (i.e., correction to an angular displacement 3 of the sheet P illustrated in FIG. 3A). Therefore, the pair of sheet holding rollers 31 is rotatable about a shaft 104*a* that is provided at the axial center of the pair of sheet holding rollers 31 in a direction indicated by arrow W in FIG. 3A (i.e., in a rotational direction within a plane of sheet conveyance or a plane of conveyance of a target sheet corresponding to a direction of angular displacement of the sheet P) and is movable in a direction indicated by arrow S in FIG. 3A (i.e., in a width direction of the sheet or the target sheet). It is to be noted that the pair of sheet holding rollers 31 may be rotatable in the direction W about a shaft provided at one axial end thereof.

Figure 4:
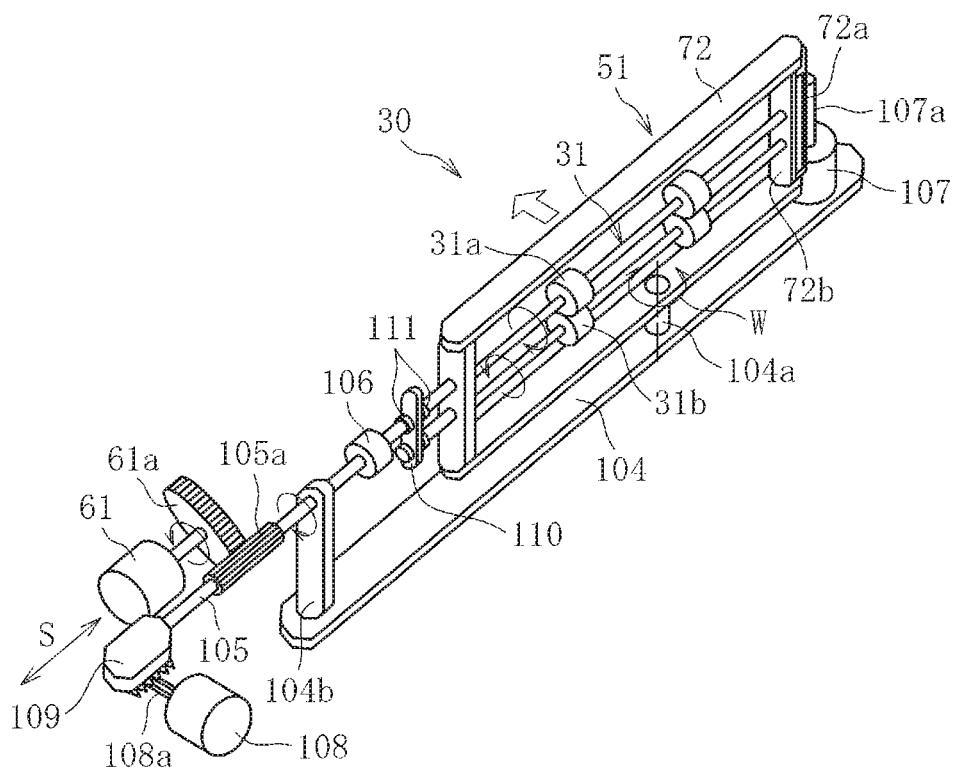
FIG. 4 is a perspective view illustrating the pair of sheet holding rollers and a driving mechanism to drive the pair of sheet holding rollers.

FIG. 4 is a perspective view illustrating the pair of sheet holding rollers 31 and a driving mechanism to drive the pair of sheet holding rollers 31.

As illustrated in FIG. 4, the pair of sheet holding rollers 31 includes multiple pairs of rollers disposed spaced apart from each other in the axial direction thereof. Each of the multiple pairs of rollers of the pair of sheet holding rollers 31 includes a drive roller 31*a* and a driven roller 31*b*. The drive roller 31*a* is rotated by a first drive motor 61 that functions as a drive device (i.e., a first drive device). The driven roller 31*b* is rotated with rotation of the drive roller 31*a*. The pair of sheet holding rollers 31 pivots about the rotation center thereof while holding the sheet P, so as to convey the sheet P.

It is to be noted that, the pair of sheet holding rollers 31 described above has rollers divided in the width direction thereof. However, the structure of a pair of sheet holding rollers is not limited thereto. For example, a pair of sheet holding rollers that is not divided in the axial direction but continuously extends over the whole axial direction thereof may be applied to this disclosure.

The first drive motor 61 is fixed to the frame of the sheet conveying device 30. A drive gear 61*a* is mounted on a motor shaft of the first drive motor 61. The drive gear 61*a* is meshed with a gear 105*a* of a frame side rotary shaft 105 that rotates together with the drive roller 31*a* of the pair of sheet holding rollers 31. According to this configuration, as the first drive motor 61 is driven and rotated, a driving force applied thereby is transmitted to the drive roller 31*a* of the pair of sheet holding rollers 31 via the drive gear 61*a* and the gear 105*a* of the frame side rotary shaft 105.

The frame side rotary shaft 105 is movably supported by an uprising portion 104*b* of a base 104 of the frame so as to move in the direction S together with movement of the pair of sheet holding rollers 31 in the direction S that corresponds to the width direction of the sheet P, as illustrated in FIG. 4. The gear 105*a* of the frame side rotary shaft 105 is sufficiently extended in the axial direction to retain the meshing with the drive gear 61*a* even when the frame side rotary shaft 105 moves in the direction S.

The frame side rotary shaft 105 and the drive roller 31a of the pair of sheet holding rollers 31 are drivingly coupled to each other to transmit the driving force via a coupling 106. The coupling 106 is a shaft coupling such as a constant velocity (universal) joint and a universal joint. With the coupling 106, even if a shaft angle of the pair of sheet holding rollers 31 to the frame side rotary shaft 105 is changed along with rotation of the pair of sheet holding rollers 31 in the direction W in FIG. 4 (i.e., the rotational direction in the plane of sheet conveyance to the direction of angular displacement), a speed of rotation does not change, and therefore the driving force is transmitted successfully.

Both the drive roller 31a and the driven roller 31b of the pair of sheet holding rollers 31 are rotationally supported by a holding member 72 having a substantially rectangular shape, to respective shafts. Further, the drive roller 31a and the driven roller 31b are supported by the holding member 72 to be respectively movable in the direction S (i.e., the axial direction) to the holding member 72.

Further, the holding member 72 is rotationally supported about the shaft 104a to the base 104 that functions as part of the frame of the sheet conveying device 30 of the image forming apparatus 1. Further, the second drive motor 107 that functions as a second drive device is mounted on one end in the width direction of the base 104. The second drive motor 107 rotates the holding member 72 in the direction W about the shaft 104a of the base 104. The second drive motor 107 has a motor shaft 62a, on a surface of which a gear is mounted. The gear mounted on the motor shaft 62a meshes with a gear 72a that is mounted on one end in the width direction of the holding member 72. According to this configuration, as the second drive motor 107 rotates in a forward direction or a reverse direction, the holding member 72 and the pair of sheet holding rollers 31 that is held by the holding member 72 rotates together about the shaft 104a. Further, a known encoder is mounted on the motor shaft 107a of the second drive motor 107, so that the degree of rotation of the pair of sheet holding rollers 31 in the direction W to a reference position of the pair of sheet holding rollers 31 and the direction of rotation of the pair of sheet holding rollers 31 (i.e., the forward direction or the reverse direction) are detected indirectly. Further, a sufficient gap is provided between a supporting part 72b disposed at one end of the holding member 72 and the gear 72a, so that the respective rotary shafts of the drive roller 31a and the driven roller 31b do not interfere with the gear 72a even if the drive roller 31a and the driven roller 31b slide to the one end in the width direction.

Further, a third drive motor 108 that functions as a third drive device is disposed on the frame of the sheet conveying device 30 of the image forming apparatus 1 so as to move the pair of sheet holding rollers 31 in the direction S. The third drive motor 108 has a motor shaft 108a, on a surface of which a pinion gear is mounted. The pinion gear mounted on the motor shaft 108a meshes with a rack gear 109 that is mounted on the other axial end of the frame side rotary shaft 105. The rack gear 109 is rotatably mounted on the frame side rotary shaft 105. According to this configuration, even when the frame side rotary shaft 105 rotates, the rack gear 109 can slide in the direction S without rotating.

Both the drive roller 31a and the driven roller 31b of the pair of sheet holding rollers 31 are linked to each other via a link 110 so that the drive roller 31a and the driven roller 31b can move in the direction S together. The link 110 is disposed between the coupling 106 and the holding member 72 to be held by a retaining ring 111 that is mounted on the respective rotary shafts of the drive roller 31a and the driven roller 31b. According to this configuration, as the third drive motor 108 rotates in the forward direction or the reverse direction, the pair of sheet holding rollers 31 moves in the direction S. Further, a known encoder is mounted on the motor shaft 108a of the third drive motor 108, so that the degree of rotation of the pair of sheet holding rollers 31 in the width direction S to a reference position of the pair of sheet holding rollers 31 and the direction of rotation of the pair of sheet holding rollers 31 (i.e., the forward direction or the reverse direction) are detected indirectly.

Now, a description is given of sheet position correction to correct the position of the sheet P, with reference to FIGS. 3A, 3B and 5A through 15.

Figure 5A:
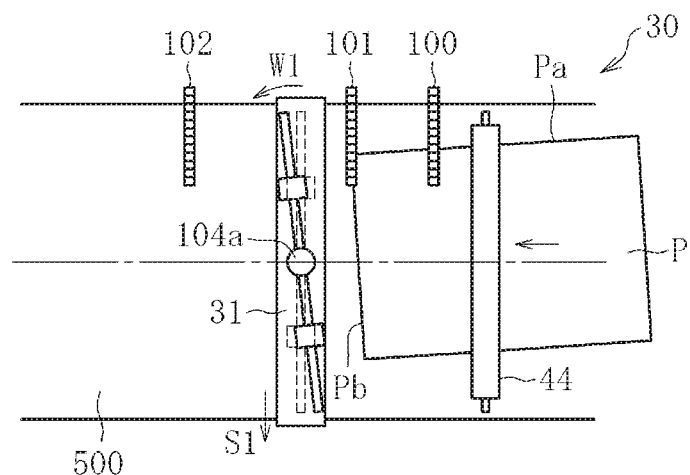
FIG. 5A is a plan view illustrating one step of a process of sheet position correction.
Figure 5B:
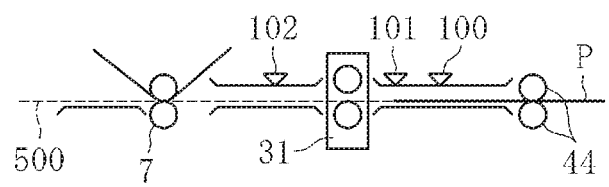
FIG. 5B is a side view illustrating the process of FIG. 5A.

The sheet P fed from any one of the first sheet feeding unit 12, the second sheet feeding unit 13, and the third sheet feeding unit 14 to the sheet conveying device 30 is further conveyed to a downstream side of the sheet conveying direction by the pair of sheet conveying rollers 44, and passes the first CIS 100, as illustrated in FIGS. 3A and 3B. As a leading end Pb of the sheet P arrives at the second CIS 101, as illustrated in FIGS. 5A and 5B, the position of the sheet P is detected (hereinafter, referred to as a "first detection"). Then, based on the result obtained by the first detection, a lateral displacement amount and an angular displacement amount are calculated. reference to FIGS. 3A, 3B and 5A through 15.

Figure 10:
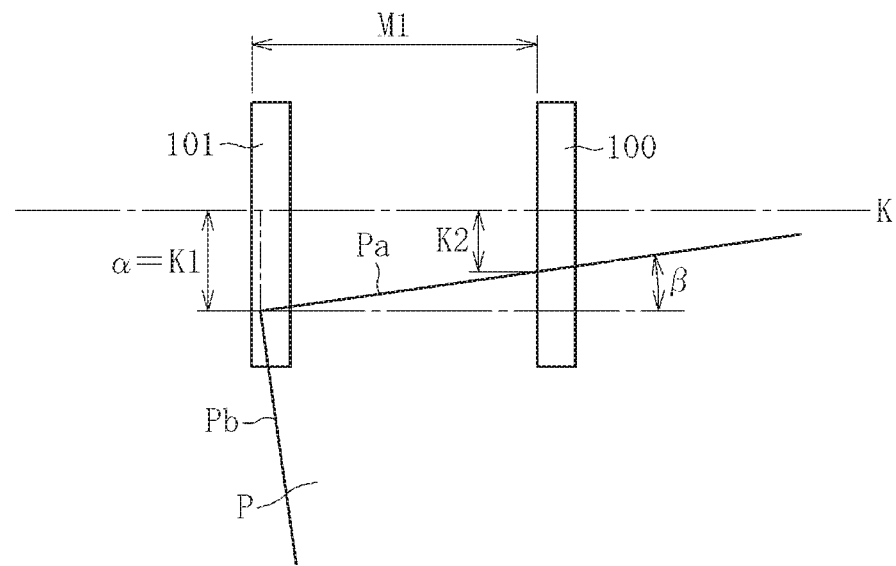
FIG. 10 is a diagram illustrating a position of the sheet for calculating a positional amount of the sheet.

Specifically, the lateral displacement amount of the sheet P based on the result of the first detection is calculated by comparing a position in the width direction of the sheet P detected by the second CIS 101 (i.e., a position of the side edge Pa of the sheet P) and a reference conveyance position K that is indicated by a straight line parallel to the sheet conveying direction illustrated in FIG. 10. Specifically, a distance K1 extending between the position of the sheet P and the reference conveyance position K is calculated as a lateral displacement amount α of the sheet P.

Next, an angular displacement amount of the sheet P is calculated based on a difference of end positions in the width direction of the sheet P detected by the first CIS 100 and the second CIS 101. That is, as illustrated in FIG. 10, when the leading end Pb of the sheet P reaches the second CIS 101, the distance K1 and a distance K2 in the width direction from the reference conveyance position K are detected by the first CIS 100 and the second CIS 101, respectively. Consequently, since a distance M1 in the sheet conveying direction between the first CIS 100 and the second CIS 101 is previously determined, an angular displacement amount β to the sheet conveying direction of the sheet P is obtained based on an equation of tan β=(K1−K2)/M1.

Figure 11:
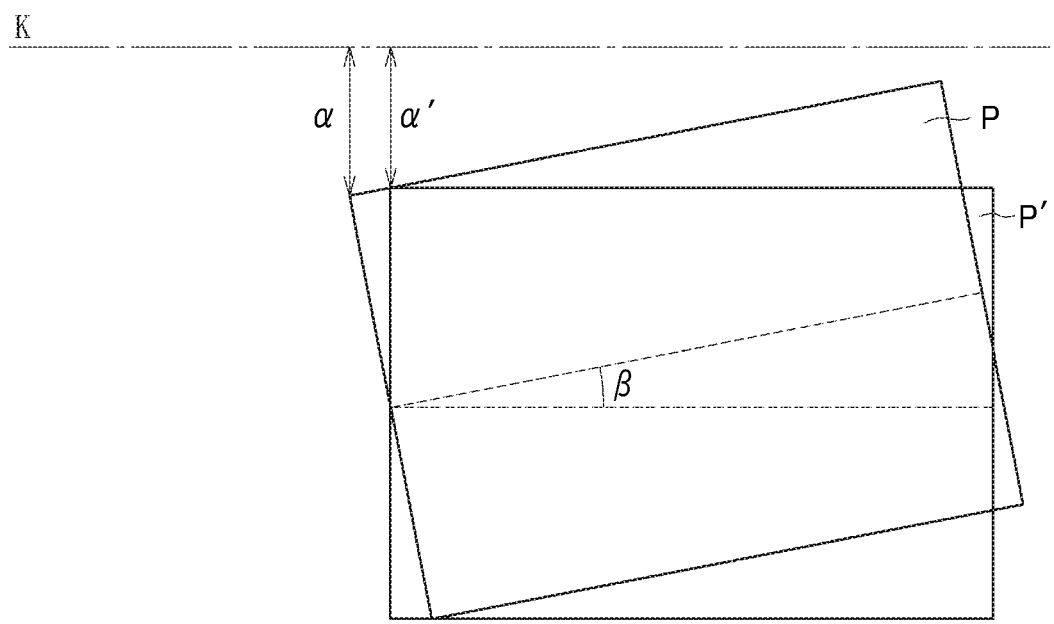
FIG. 11 is a diagram illustrating a lateral displacement amount of the sheet.

Then, based on the lateral displacement amount α of the sheet P and the angular displacement amount β of the sheet P obtained as described above, the pair of sheet holding rollers 31 performs a lateral displacement correction of the sheet P and an angular displacement correction of the sheet P, which is hereinafter referred to as a "primary correction." The angular displacement of the sheet P is corrected by the amount of the deviation angle β. Further, the lateral displacement of the sheet P is corrected based on the lateral displacement amount α and the deviation angle β. For example, as illustrated in FIG. 11, after correction of the deviation angle β has been corrected, the lateral displacement amount α of the sheet P changes to a lateral displacement amount α'. After having been calculated, the lateral displacement amount α' is regarded as the amount of the lateral displacement correction α' to be corrected by the pair of sheet holding rollers 31. (However, the correction amount $\alpha'$ varies depending on a reference position of the correction of the deviation angle $\beta$.)

Figure 12:
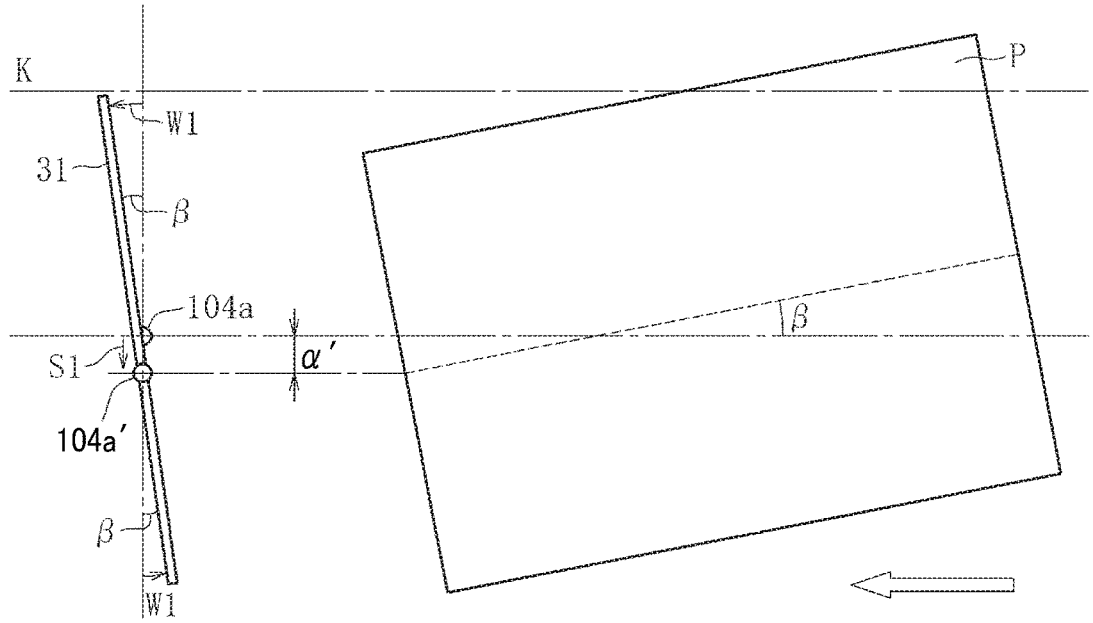
FIG. 12 is a diagram illustrating a pick up and hold operation of the pair of sheet holding rollers.

Here, prior to the first detection, the pair of sheet holding rollers 31 is disposed at the reference position illustrated in FIG. 3A. Before the sheet P reaches the pair of sheet holding rollers 31, the pair of sheet holding rollers 31 perform a pick up and hold operation to move by the amount of movement of the primary correction in an opposite direction to the direction of the primary correction. Specifically, as illustrated in FIG. 12, before holding the sheet P, the pair of sheet holding rollers 31 rotates about a shaft 104a in a direction indicated by arrow W1 by the deviation angle $\beta$ and at the same time moves in parallel thereto in a direction indicated by arrow S1 by the distance of the lateral displacement amount $\alpha'$. With the rotation, the shaft 104a moves to the position indicated as a shaft 104a'. The above-described pick up and hold operation is performed after the first detection and before the pair of sheet holding rollers 31 holds the sheet P, as illustrated in FIGS. 5A and 5B.

Figure 6A:
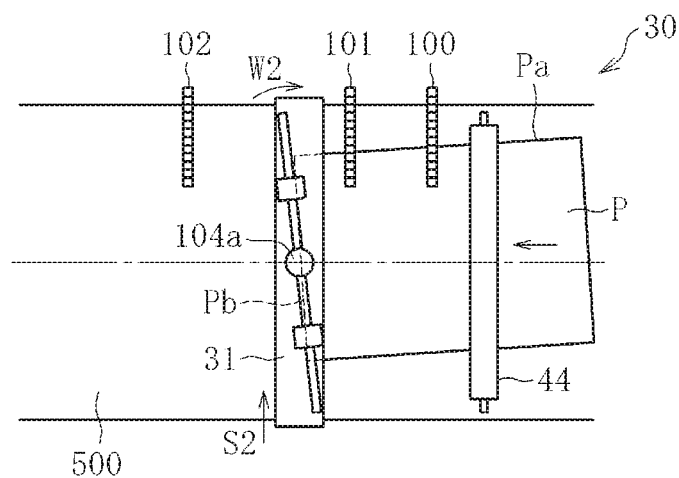
FIG. 6A is a plan view illustrating another subsequent step of the process of sheet position correction.
Figure 6B:
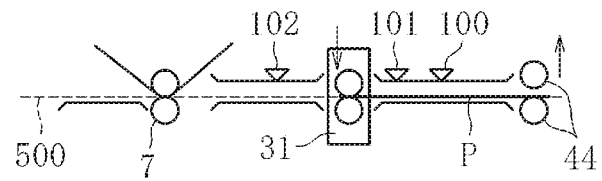
FIG. 6B is a side view illustrating the process of FIG. 6A.

Then, as the leading end Pb of the sheet P reaches the pair of sheet holding rollers 31, the pair of sheet holding rollers 31 holds the sheet P, as illustrated in FIGS. 6A and 6B. At this time, as illustrated in FIG. 6B, the rollers of the pair of sheet conveying rollers 44 disposed upstream from the pair of sheet conveying rollers 44 in the sheet conveying direction separate from each other, so that the rollers of the pair of sheet conveying rollers 44 do not hold the sheet P.

Figure 7A:
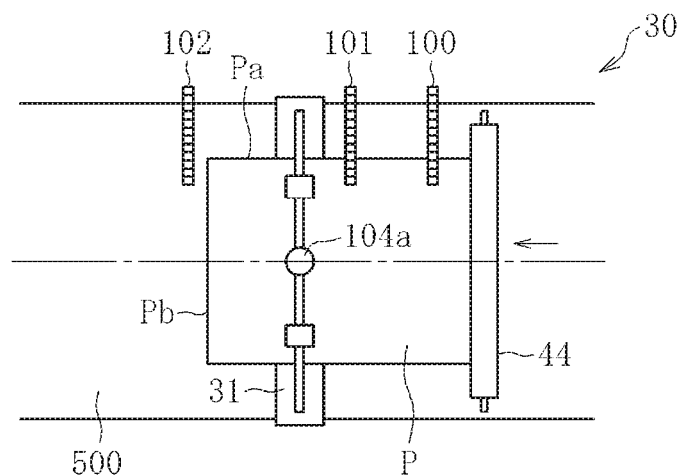
FIG. 7A is a plan view illustrating yet another subsequent step of the process of sheet position correction.
Figure 7B:
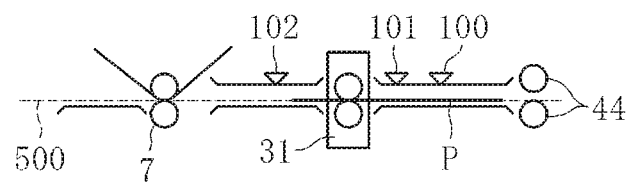
FIG. 7B is a side view illustrating the process of FIG. 7A.

As illustrated in FIG. 6A, when the primary correction starts, the pair of sheet holding rollers 31 rotates, while holding and conveying the sheet P, about the shaft 104a in a direction indicated by arrow W2 based on the amount of angular displacement of the sheet P obtained by the result of the first detection. By so doing, the pair of sheet holding rollers 31 corrects the position of the sheet P in the direction of the angular displacement of the sheet P. At the same time, the pair of sheet holding rollers 31 moves in parallel in a direction indicated by arrow S2, so as to correct the position of the sheet P in the width direction. Accordingly, the primary correction performed by the pair of sheet holding rollers 31 is completed, and the position of the sheet P is corrected, as illustrated in FIGS. 7A and 7B.

Figure 13:
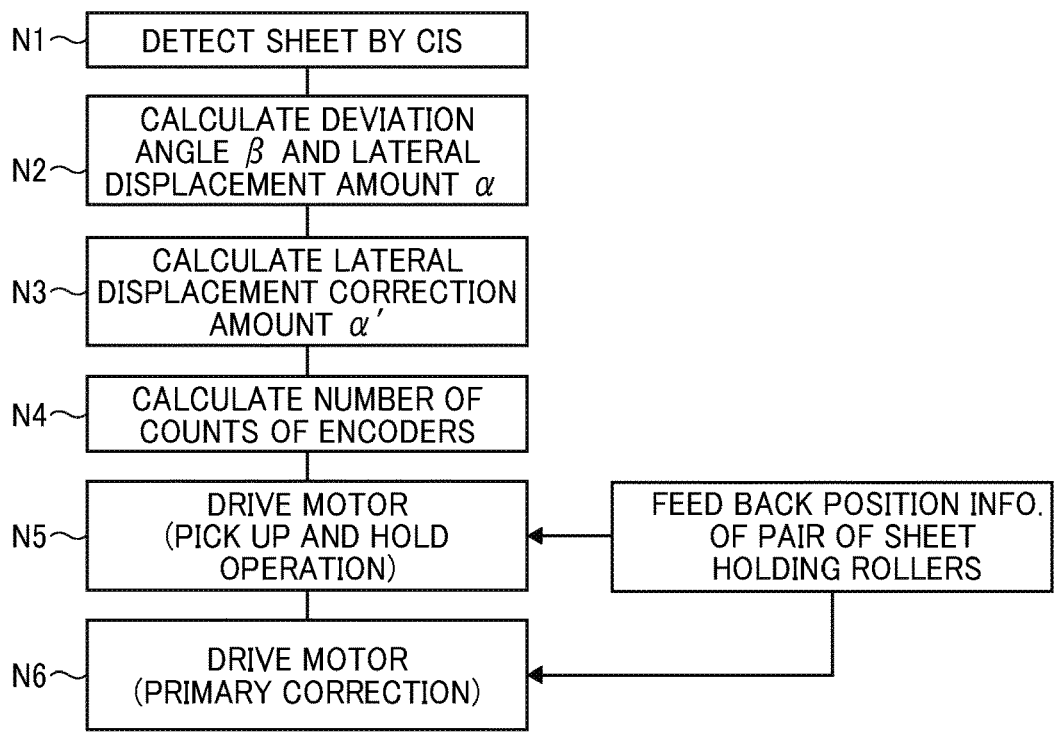
FIG. 13 is a flowchart of a control flow prior to a primary correction.
Figure 14:
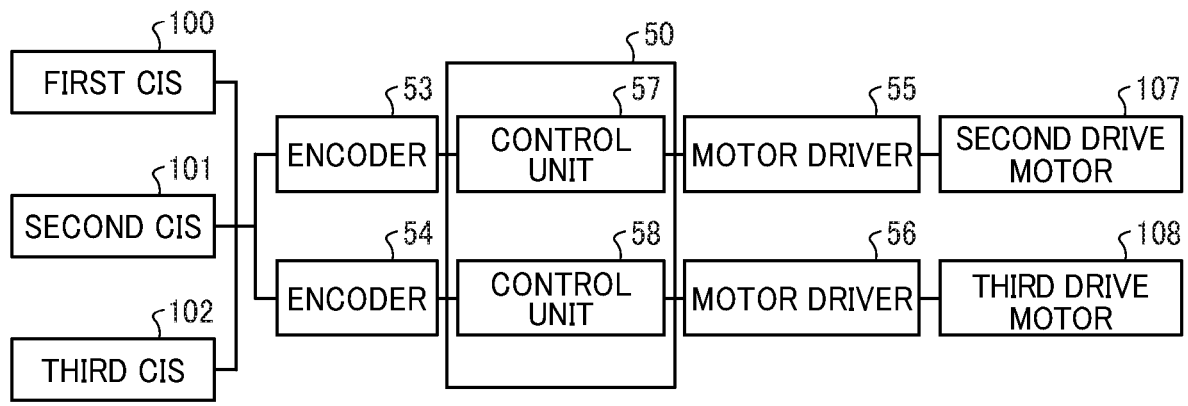
FIG. 14 is a block diagram illustrating a controller that controls the pair of sheet holding rollers.

FIG. 13 is a flowchart of a control flow from the start to the above-described primary correction. FIG. 14 is a block diagram illustrating a controller 50 related to the primary correction.

As illustrated in FIG. 13, the first CIS 100 and the second CIS 101 detect the sheet P, in step N1. Then, the lateral displacement amount $\alpha$ of the sheet P and the angular displacement amount $\beta$ of the sheet P are calculated, in step N2. Based on the lateral displacement amount $\alpha$ and the angular displacement amount $\beta$ detected in step N2, the lateral displacement correction amount $\alpha'$ is calculated in step N3. Accordingly, the correction amount of the primary correction (i.e., the angular displacement correction amount $\beta$ and the lateral displacement correction amount $\alpha'$) are determined.

Based on the detected correction amounts, encoders 53 and 54 (see FIG. 14) calculate the number of counts thereof, in step N4.

Then, the determined numbers of counts are inputted to respective control units 57 and 58 of the controller 50 to drive the pair of sheet holding rollers 31. Thereafter, respective motor drivers 55 and 56 drive the second drive motor 107 and the third drive motor 108 according to the respective numbers of counts of the respective encoders 53 and 54, and then the pair of sheet holding rollers 31 either rotates in the rotation direction within a plane of sheet conveyance (i.e., the direction W) or moves in parallel in the width direction (i.e., the direction S), in step N5. While holding and conveying the sheet P driven by the second drive motor 107 and the third drive motor 108, the pair of sheet holding rollers 31 rotates or moves in a direction opposite the direction of the pick up and hold operation while conveying the sheet P. Accordingly, the pair of sheet holding rollers 31 performs the adjustment and feed operation, in step N6 of the flowchart of FIG. 13. When the pair of sheet holding rollers 31 performs the pick up and hold operation and the primary correction, the respective encoders 53 and 54 feed back the position information of the pair of sheet holding rollers 31 continuously. Accordingly, the pair of sheet holding rollers 31 is controlled to move by the determined amount of movement. According to the above-described operation, the position of the pair of sheet holding rollers 31 after completion of the primary correction approaches the reference position. However, it is not determined that the pair of sheet holding rollers 31 returns to the reference position by performing the secondary correction, which is described below.

As described above, in the present embodiment, the positional correction of the sheet P (i.e., the primary correction) is performed based on the lateral and angular displacement amounts of the sheet P obtained by the detection result of the first CIS 100 and the second CIS 101. However, there is a case that the primary correction alone is not sufficient to achieve the precise position of the sheet P.

Specifically, after the primary detection, a force is applied to the sheet P by the pair of sheet holding rollers 31 when the sheet P is held by the pair of sheet holding rollers 31. Therefore, it is likely that a further positional deviation occurs to the sheet P. Further, when the pair of sheet holding rollers 31 corrects the position of the sheet P or conveys the sheet P toward the downstream side in the sheet conveying direction, it is likely that a further positional deviation is generated to the sheet P. Further, it is also likely that a correction error occurs in the primary correction.

In order to address these inconveniences, the sheet conveying device 30 according to the present embodiment performs a secondary correction after the primary correction so as to further correct the position of the sheet P.

Now, a description is given of the secondary correction.

Figure 8A:
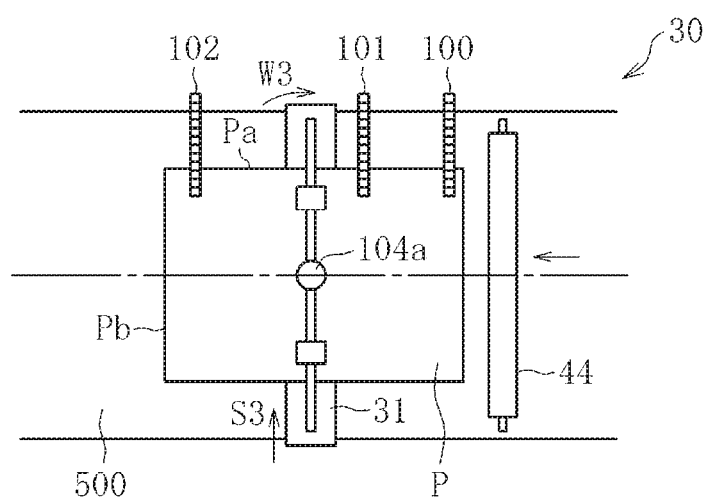
FIG. 8A is a plan view illustrating yet another subsequent step of the process of sheet position correction.
Figure 8B:
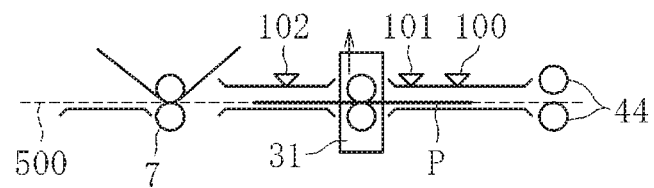
FIG. 8B is a side view illustrating the process of FIG. 8A.

After the primary correction, as the leading end Pb of the sheet P arrives at the third CIS 102, as illustrated in FIGS. 8A and 8B, the position of the sheet P is detected again by the second CIS 101 and the third CIS 102 (hereinafter, referred to as a "second detection"). Then, based on the result obtained by the second detection, lateral and angular displacement amounts of the sheet P are calculated.

The lateral and angular displacement amounts of the sheet P based on the second detection are calculated by the same steps as the first detection, based on the detection results obtained by the upstream side CIS and the downstream side CIS. That is, the lateral displacement amount $\alpha$ is obtained based on the position of the sheet P in the width direction obtained by the third CIS 102 (i.e., the position of the side edge Pa in the width direction). Further, the angular displacement amount of the sheet P is calculated based on the respective positions in the width direction of the sheet P obtained by the second CIS 101 and the third CIS 102 and the distance between the second CIS 101 and the third CIS 102. (In second detection, the position of the sheet P is detected by the second CIS 101 that is replaced by the first CIS 100 used in the first detection and the third CIS 102 that is replaced by the second CIS 101 used in the first detection.)

Then, based on the lateral and angular displacement amounts of the sheet P calculated based on the detection result obtained through the second detection, the pair of sheet holding rollers 31 moves, while conveying the sheet P, in a direction indicated by arrow S3 in FIG. 8A, and rotates about the shaft 104a in a direction indicated by arrow W3. By so doing, the secondary correction is performed.

Figure 15:
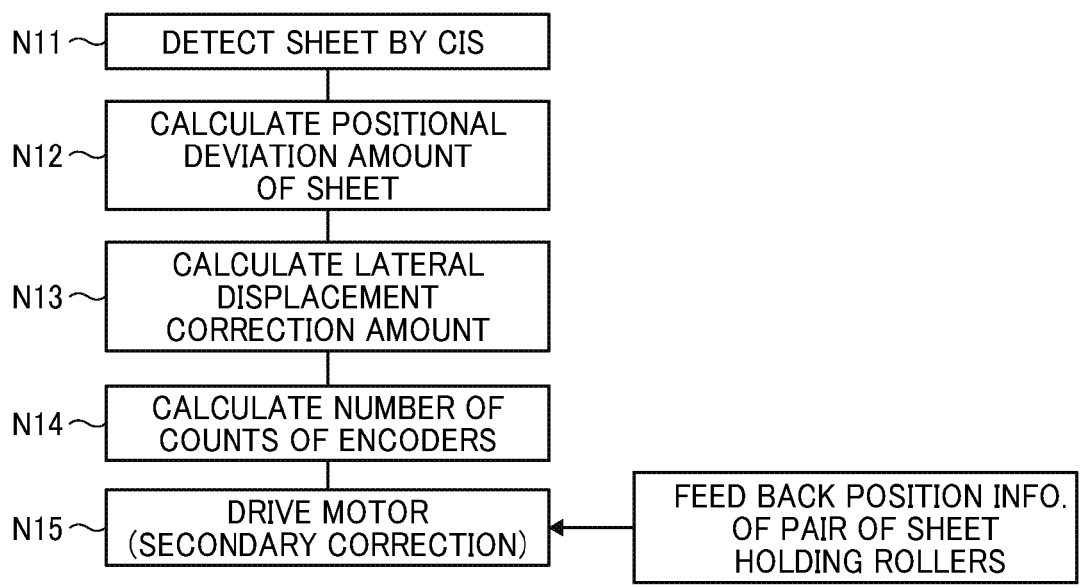
FIG. 15 is a flowchart of a control flow of a secondary correction.

FIG. 15 is a flowchart of a control flow of the secondary correction.

In the secondary correction, the second CIS 101 and the third CIS 102 detect the sheet P, in step N11. Then, with the same steps as the primary correction, the lateral and angular displacement amount of the sheet P are calculated, in step N12. Then, lateral and angular displacement correction amounts are calculated based on the calculated lateral and angular displacement amounts, in step N13, and the number of counts of each of the encoders 53 and 54 is calculated based on the calculated correction amounts, in step N14. Thereafter, the motor drivers 55 and 56 drive the second drive motor 107 and the third drive motor 108 according to the respective numbers of counts of the respective encoders 53 and 54, and then the pair of sheet holding rollers 31 performs the secondary correction, in step N15.

During the secondary correction, the second CIS 101 and the third CIS 102 continuously detect the position information of the sheet P after the start of the secondary correction. Then, the positional deviation amount of the sheet P is detected based on the position information and is fed back to the controller 50. Accordingly, the lateral displacement correction amount of the sheet P and the angular displacement correction amount of the sheet P are updated continuously. By performing the feedback control as described above, the positional deviation of the sheet P that may occur in the secondary correction and the correction error in the secondary correction can be modified, and therefore the correction can be performed with higher accuracy. However, the secondary correction may be performed without the feedback control, specifically, may be performed based on the correction amount calculated on arrival of the leading end of the sheet P at the third CIS 102.

Figure 9A:
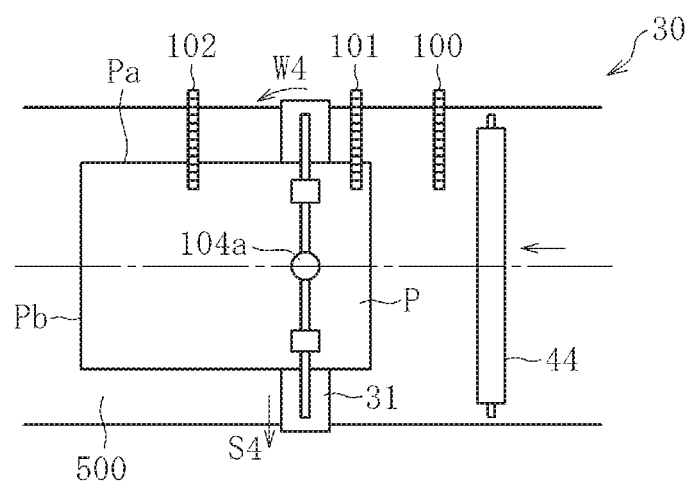
FIG. 9A is a plan view illustrating yet another subsequent step of the process of sheet position correction.
Figure 9B:
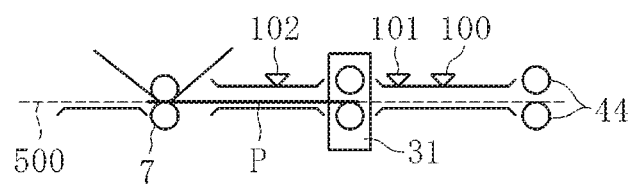
FIG. 9B is a side view illustrating the process of FIG. 9A.

As described above, the sheet P after completion of the primary correction and the secondary correction is conveyed by the pair of sheet holding rollers 31 toward the secondary transfer portion 7. As the sheet P reaches the secondary transfer portion 7, as illustrated in FIGS. 9A and 9B, the pair of sheet holding rollers 31 separates the sheet P and returns to the reference position for preparation of sheet position correction and conveyance of a subsequent sheet P. (In FIG. 9A, the pair of sheet holding rollers 31 returns to the reference position by moving in a direction indicated by arrow S4 and rotating about the shaft 104a in a direction indicated by arrow W4.)

As described above, in a sheet conveying device in which the position of a sheet is corrected by moving the sheet in a sheet conveyance passage, a contact resistance is generated when the sheet contacts a neighboring part or parts disposed in the vicinity of a conveyance guide and a pair of sheet conveying rollers during the sheet position correction. Since the sheet cannot follow the correction operation of the pair of sheet holding rollers due to such contact resistance, it is likely that the accuracy of sheet position correction deteriorates. In the configuration of the present embodiment having curved portions (i.e., the first curved portion 200, the second curved portion 300 and the third curved portion 400 as illustrated in FIG. 2) in the upstream side of the pair of sheet holding rollers 31 in the sheet conveying direction, when the pair of sheet holding rollers 31 corrects the position of the sheet P, the trailing end of the sheet P strongly contacts the sheet conveying guide at the curved portion. Consequently, the contact resistance that is generated at the trailing end of the sheet P increases, and therefore the following performance of the sheet P to the correcting operation further deteriorates.

In order to avoid this inconvenience, the sheet conveying device 30 according to the present embodiment of this disclosure includes a contact resistance reducer to reduce contact resistance generated by contact of a sheet to a neighboring part or parts.

Now, a description is given of the contact resistance reducer.

Figure 16:
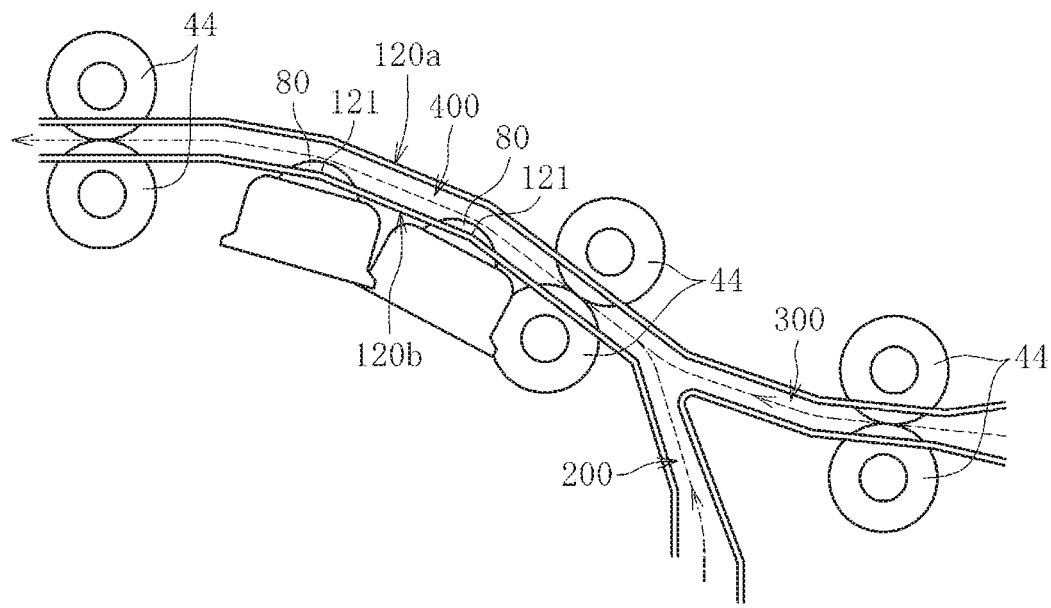
FIG. 16 is a diagram illustrating a configuration that employs spheres as a contact resistance reducer.

FIG. 16 is a diagram illustrating a configuration that employs a sphere as a contact resistance reducer.

As illustrated in FIG. 16, in the present embodiment, multiple spheres 80, each being a rolling body that functions as a contact resistance reducer in the third curved portion 400 disposed upstream from the pair of sheet holding rollers 31 in the sheet conveying direction.

An upper sheet conveyance guide 120a and a lower sheet conveyance guide 120b are disposed opposing to each other, so as to guide the sheet P to be conveyed. Each of the spheres 80 is disposed projected upwardly (toward the sheet conveyance passage) from the lower sheet conveyance guide 120b.

It is to be noted that a part upwardly projecting (toward the sheet conveyance passage) from the lower sheet conveyance guide 120b is smaller than a half of each sphere 80. The center of each sphere 80 is disposed lower from the upper face (i.e., a guide face) of the lower sheet conveyance guide 120b (i.e., the opposite side to the sheet conveyance passage).

Further, each of the spheres 80 is located at a position corresponding to a bent portion 121 (i.e., a top or corner of a bent portion). That is, each of the spheres 80 is located at a portion on the upper face of the lower sheet conveyance guide 120b, where the sheet P is likely to contact.

Figure 17:
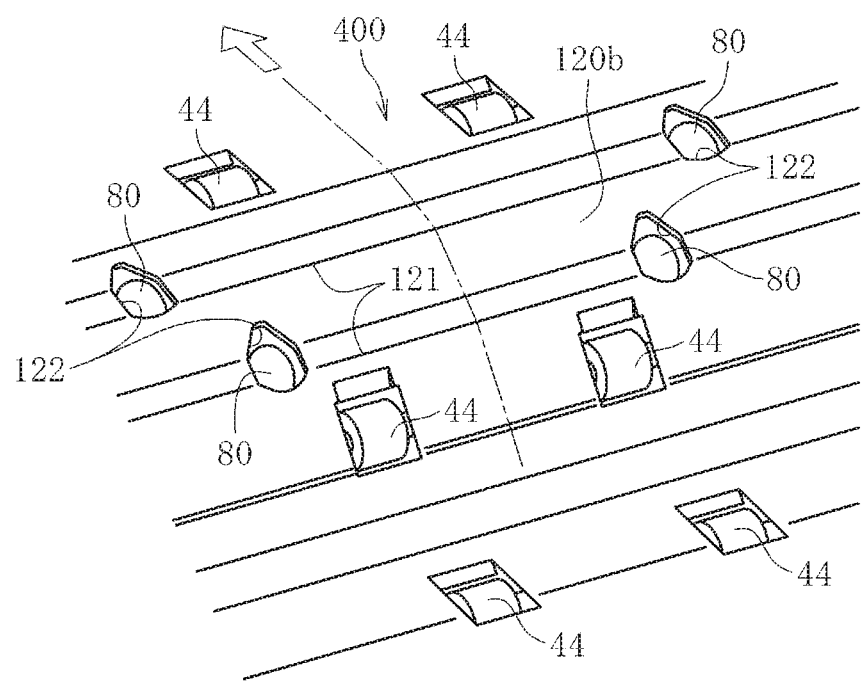
FIG. 17 is a perspective view illustrating a sheet conveyance guide to which the spheres are disposed.

As illustrated in FIG. 17, an opening 122 is formed in the bent portion 121 of the lower sheet conveyance guide 120b. Each of the spheres 80 projects upwardly from the opening 122.

Further, in the present embodiment, each of the spheres 80 is disposed at both sides based on a center position in the width direction of the lower sheet conveyance guide 120b in the third curved portion 400 (i.e., a position indicated by a broken line in FIG. 17).

Figure 18:
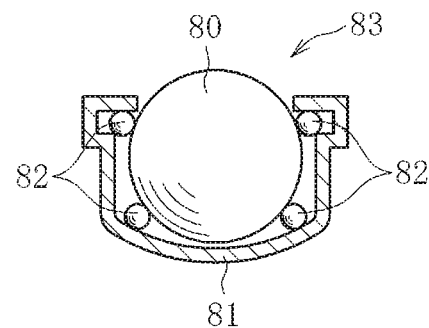
FIG. 18 is a cross sectional view illustrating a sphere unit.

As illustrated in FIG. 18, the spheres 80 are assembled with multiple supporting spheres 82 in a housing 81, which form a single sphere unit 83. The multiple supporting spheres 82 have a small diameter than the spheres 80 and are contained between the housing 81 and the spheres 80. By being supported by the multiple supporting spheres 82 that are rotatably disposed, the spheres 80 are rotatable in any direction, that is, the sheet conveying direction to which the sheet P is conveyed and any directions interfering with the sheet conveying direction.

Figure 19:
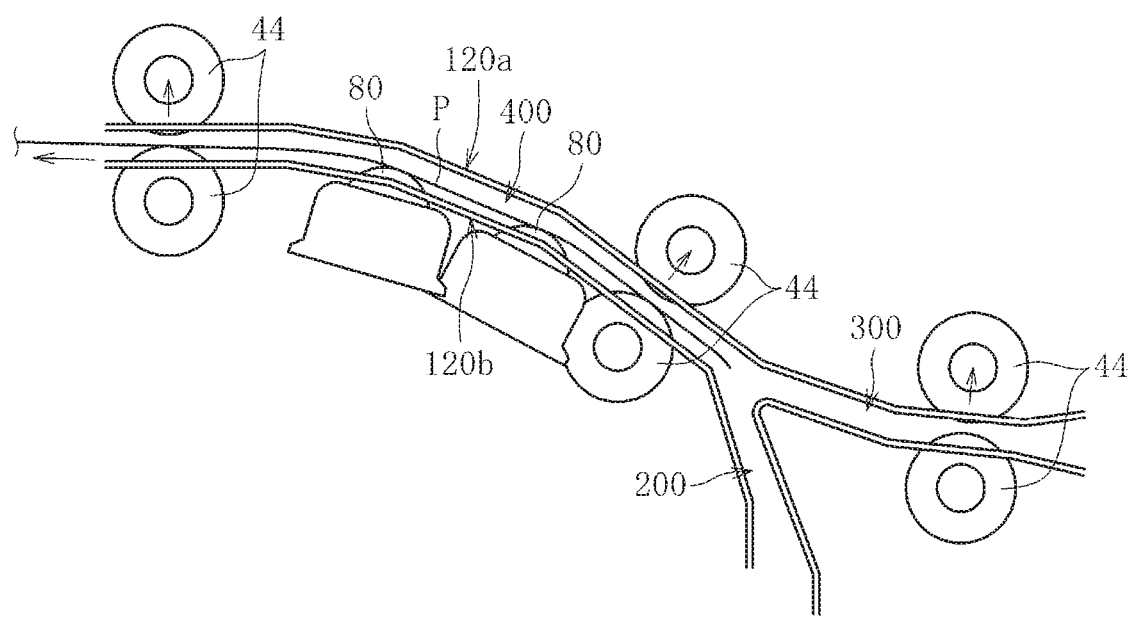
FIG. 19 is a diagram illustrating a state in which a sheet is conveyed into a curved portion of a sheet conveyance passage where the spheres are disposed.

By disposing the spheres 80 to project from the lower sheet conveyance guide 120b, when the sheet P is conveyed in the third curved portion 400 and the pair of sheet holding rollers 31 corrects the position of the sheet P, as illustrated in FIG. 19, as the sheet P contacts the spheres 80, the spheres 80 rotate by following movement of the sheet P in the width direction and the rotation direction within a plane of sheet conveyance. Consequently, the sheet P can be conveyed smoothly. Further, the sheet P contacts the spheres 80 in point contact, and therefore the contact resistance is smaller than a case in which a sheet P is conveyed while contacting the lower sheet conveyance guide 120b in surface contact. As described above, since the sheet P moves more smoothly and the contact resistance that is generated to the sheet P becomes smaller, the following performance of the sheet P to the sheet position correction is enhanced, and therefore the sheet position correction can be performed with higher accuracy.

The layout and number of the spheres 80 and the diameter of each of the spheres 80 may be determined according to the type and size of a sheet to be conveyed and the curvature of the sheet conveyance passage. In the present embodiment, by locating the spheres 80 (i.e., the spheres 80 on the front side in FIG. 17) in the vicinity of the pair of sheet conveying rollers 44, as illustrated in FIG. 17, the spheres 80 contact to any sheet of various sizes in the width direction. In other words, by disposing the adjacent spheres 80 relatively close to each other in the width direction, the spheres 80 contact a sheet having a small size in the width direction.

Further, in the present embodiment, two spheres 80 disposed on a downstream side of the sheet conveying direction (i.e., in a direction indicated by arrow in FIG. 17) are separated wider in the width direction than different two spheres 80 disposed on an upstream side of the sheet conveying direction. As described above, by providing different intervals of the spheres 80 in the width direction between the upstream side and the downstream side in the sheet conveying direction, the spheres 80 contact the sheet P at different positions in the width direction, and therefore the spheres 80 can support the sheet P stably. It is to be noted that the location of the spheres 80 is not limited thereto. For example, the spheres 80 may be located at identical intervals in the width direction.

Figure 20:
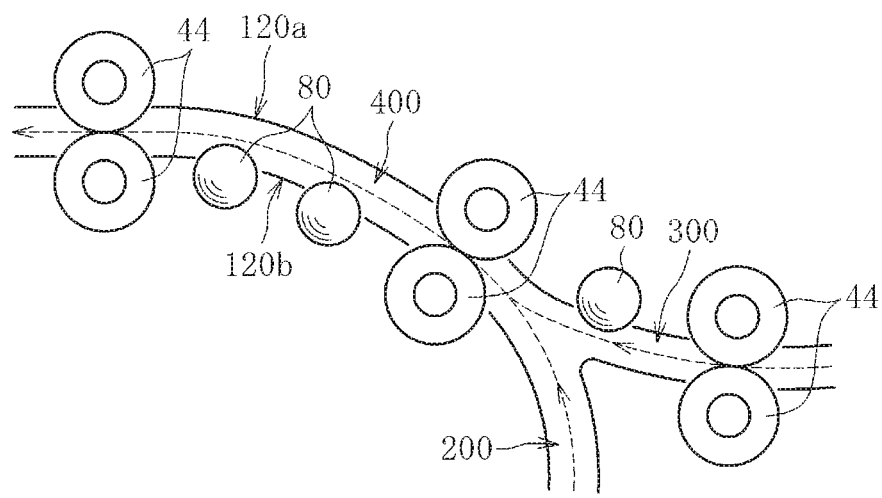
FIG. 20 is a diagram illustrating a configuration that the spheres are disposed in another curved portion of the sheet conveyance passage.

In the present embodiment, the spheres 80 are disposed in the third curved portion 400. However, the layout of the spheres 80 is not limited thereto. For example, as illustrated in FIG. 20, the sphere 80 or the spheres 80 may be located in the second curved portion 300. The sheet conveyance passage from the second curved portion 300 to the third curved portion 400 is an S-shaped conveyance passage in which the bending direction is reversed in the middle. Therefore, when the sheet P is conveyed along the sheet conveyance passage, the contact resistance of the sheet P to the sheet conveyance guide is likely to substantially increase. For example, in a case in which a long sheet is conveyed with the trailing end remaining in the second curved portion 300 when the pair of sheet holding rollers 31 corrects the position of the long sheet, a large contact resistance is expected to be generated at the trailing end of the long sheet. Therefore, in order to reduce such contact resistance in the second curved portion 300, it is effective to locate the spheres 80 at the second curved portion 300, as illustrated in FIG. 20. According to this configuration, the long sheet in the S-shaped sheet conveyance passage can move smoothly, and therefore the following performance of the sheet to the sheet position correction can be enhanced.

Figure 21:
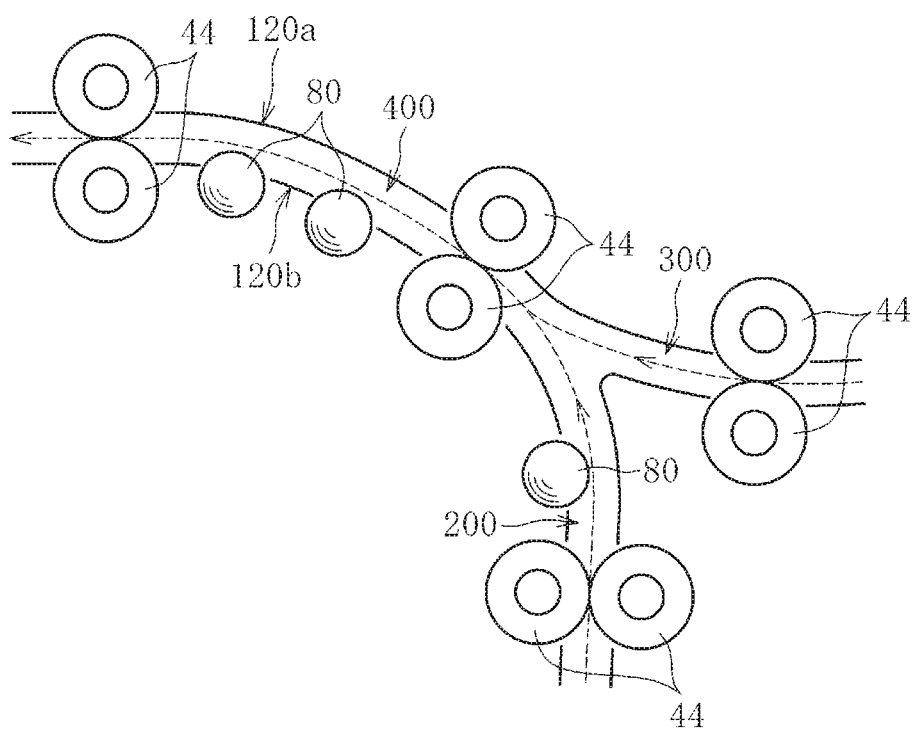
FIG. 21 is a diagram illustrating a configuration that the spheres are disposed in yet another curved portion of the sheet conveyance passage.

Further, the spheres 80 may be disposed at the first curved portion 200, as in the configuration of FIG. 21. The sheet conveyance passage from the first curved portion 200 to the third curved portion 400 is a U-shaped conveyance passage in which the bending direction is consecutively same. However, if the trailing end of the sheet is passing through the first curved portion 200 when the pair of sheet holding rollers 31 corrects the position of the sheet, the contact resistance is generated to the trailing end of the sheet. Therefore, in order to reduce such contact resistance in the first curved portion 200, it is effective to locate more spheres 80 at the first curved portion 200, as illustrated in FIG. 21. According to this configuration, the sheet can move smoothly.

Figure 22:
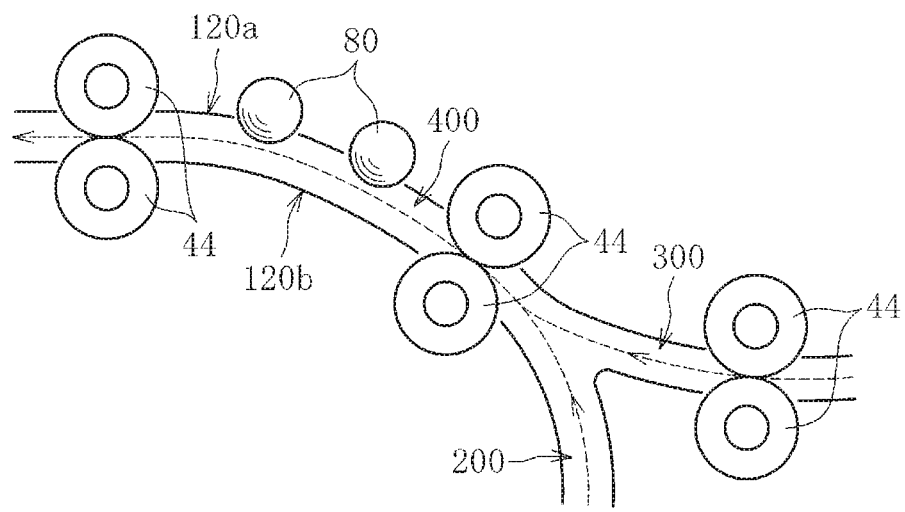
FIG. 22 is a diagram illustrating a configuration that the spheres are disposed on an outer side of a curved portion of the sheet conveyance passage.

Further, in the present embodiment illustrated in FIG. 16, the spheres 80 are disposed on an inner face of the third curved portion 400 (i.e., the opposite side to which the third curved portion 400 upwardly projects). However, the layout of the spheres 80 is not limited thereto. For example, as illustrated in FIG. 22, the sphere 80 or the spheres 80 may be located on an outer face of the third curved portion 400. The contact portion of the sheet in the sheet conveyance passage is susceptible to the shape of the sheet conveyance passage and the rigidity of a sheet. Therefore, whether the spheres 80 are located on the inner face, the outer face or both of the curved portion may be considered and determined according to various conditions.

As an example of material of each sphere 80, metal, resin or glass may be employed. Further, the surface of each sphere 80 may be processed by coating. For example, in a case in which the spheres 80 are steel balls, if the surface of each steel ball is coated by resin, sound of vibration at rotation of the steel ball can be restrained.

Further, it is preferable that the spheres 80 are processed to prevent adhesion of toner. If there is a scratched portion on the surface of each sphere 80, toner adheres into and accumulates in the scratched portion. Therefore, when the sheet contacts the spheres 80, a streak or streaks may be generated on the image formed on the sheet or smooth rotation of the spheres 80 may be hindered. Specifically, when a duplex printing is performed in a copier such as the image forming apparatus 1 according to the present embodiment of this disclosure, a toner image fixed to the front of a sheet contacts the spheres 80 during sheet conveyance in the duplex printing, and therefore it is likely that part of toner adheres to the spheres 80. In order to address this inconvenience, it is preferable that the spheres 80 are balls processed to reduce adhesion of toner, for example, stainless steel balls manufactured by mirror surface machining or brass metallic balls, glass balls, or resin balls.

Further, in order to enhance the following performance of the spheres 80 to movement of the sheet during the sheet position correction, the mass of the spheres 80 may be lowered so as to reduce the rolling resistance. For example, the core of each sphere 80 is made of plastic material, and a hard plated finishing such as bright nickel plated finishing or bright chromium plated finishing is processed on the surface of the spheres 80. Accordingly, the spheres 80 have low mass, smoothness and stiffness. Further, in a case in which the spheres 80 are insufficient in smoothness, stiffness and low friction performance, it is effective to process diamond coating (or DLC coating, diamond-like carbon coating) on the surface of each of the spheres 80. Further, the above-described surface machining may be processed on the supporting spheres 82. By so doing, the smoothness, stiffness and low friction performance of the supporting spheres 82 are enhanced, and the spheres 80 can rotate more stably.

When locating the multiple spheres 80 in the sheet conveyance passage, if each sphere unit (see FIG. 18) including a single sphere 80, the multiple supporting spheres 82 and a housing 81 is mounted one by one on a sheet conveyance guide such as the lower sheet conveyance guide 120b, it is a hard and time-consuming work to mount a large number of sphere units to the sheet conveyance guide. In addition, a structure for mounting multiple sphere units one by one needs to be provided. For example, by providing screw hole or holes to fix each sphere unit and a positioning hole or holes to position each sphere unit to a sheet conveyance guide, it is expected that these holes hinder movement of the sheet.

Figure 23:
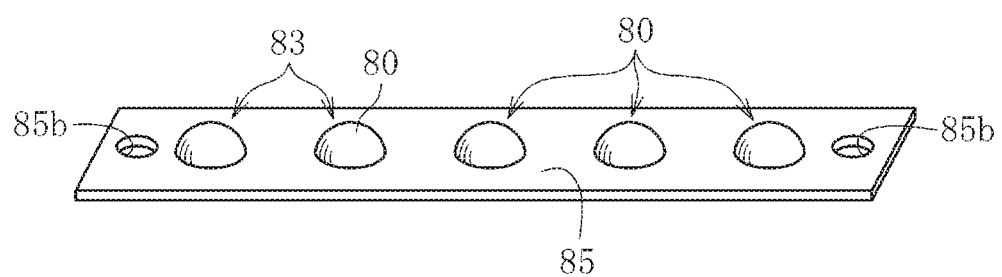
FIG. 23 is a diagram illustrating a configuration in which multiple sphere units are attached to a base plate.
Figure 24:
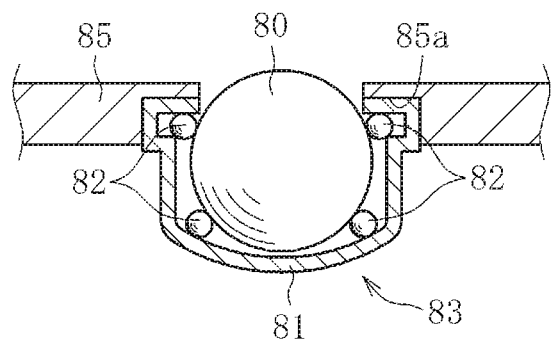
FIG. 24 is a diagram illustrating an attaching mechanism of the sphere unit relative to the base plate.

In order to avoid this inconvenience, multiple sphere units 83 are previously mounted on a base plate 85 formed to extend in the width direction of the sheet P, as illustrated in FIG. 23, so that the base plate 85 may be attached to the sheet conveyance guide. As illustrated in FIG. 24, a recess 85*a* is formed in the back face (i.e., an opposite face to the sheet conveyance passage) of the base plate 85. By fixedly inserting each of the sphere units 83 into the recess 85*a*, the sphere 80 is rotatably mounted on the base plate 85. In order to mount the base plate 85 on the sheet conveyance guide, each of the spheres 80 mounted on the base plate 85 is positioned to each opening 122 (see FIG. 17) formed in the sheet conveyance guide. Then, respective fastening members such as screws are inserted into openings 85*b* (see FIG. 23), each formed at both ends of the base plate 85, so that the base plate 85 is fastened to the sheet conveyance guide. Further, by mounting multiple base plates 85 as described above on the sheet conveyance guide in the sheet conveying direction, the multiple sphere units 83 can be located along the sheet conveying direction.

Accordingly, by previously mounting multiple sphere units 83 on a single base plate 85, the sphere units 83 to the sheet conveyance guide can be attached easily. Further, the precision of attachment of each of the sphere units 83 can be enhanced. Further, screw holes and positioning holes used to attach each sphere unit 83 are not formed in the sheet conveyance guide. Therefore, the sheet can be prevented from being caught by the sheet conveyance guide, and as a result, the sheet can be moved more smoothly during the sheet position correction.

In the above-described configuration, the sphere units 83 are mounted on a sheet conveyance guide but the configuration is not limited thereto. For example, the spheres 80 and the supporting spheres 82 may be directly mounted on a sheet conveyance guide 120, as illustrated in FIG. 25.

Figure 25:
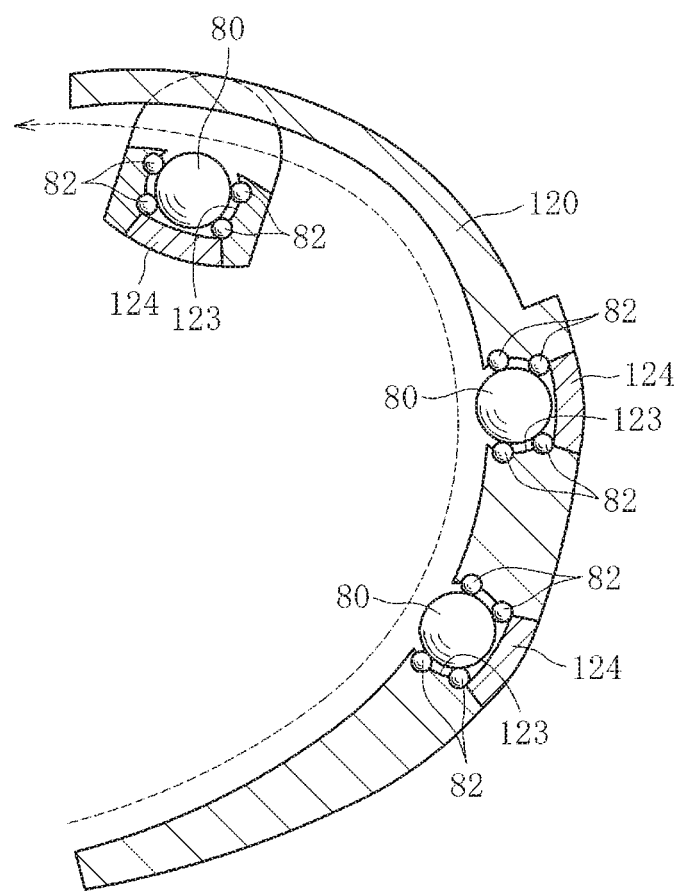
FIG. 25 is a diagram illustrating a configuration in which the spheres and respective support spheres are directly attached to the sheet conveyance guide.

In the configuration illustrated in FIG. 25, the sheet conveyance guide 120 is curved and is integrally made of resin, to which the sphere 80 and the supporting spheres 82 are directly attached. A sphere container 123 is provided to the sheet conveyance guide 120. The sphere container 123 includes an opening into which the sphere 80 is fitted and two gutters into which each of the supporting spheres 82 is fitted. The sphere 80 and the supporting spheres 82 are contained by being inserted into the sphere container 123 from the back of the sheet conveyance guide 120 (i.e., the opposite side to the sheet conveyance passage indicated by arrow of a broken line). In a state in which the sphere 80 and the supporting spheres 82 are contained in the sphere container 123, a cap 124 is attached to an opening of the sphere container 123 from the back of the sheet conveyance guide 120. By so doing, the sphere 80 and the supporting spheres 82 are prevented from coming off from the sphere container 123.

Thus, by directly mounting the sphere 80 and the supporting spheres 82 on the sheet conveyance guide 120, a reduction in cost and size and an increase in efficiency of the mounting process can be achieved. That is, the sheet conveyance guide 120 also functions as a housing to hold the sphere 80 and the supporting spheres 82, and therefore a different housing is not added and the number of parts can be reduced.

Figure 26:
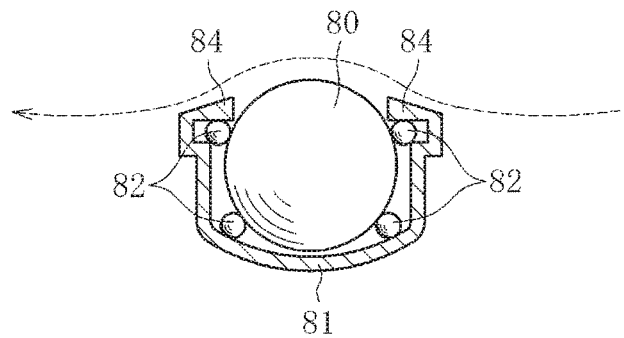
FIG. 26 is a diagram illustrating a configuration in which a sloped face is provided around the sphere.

Further, as illustrated in FIG. 26, an inclined face 84 that is tilted to the sheet conveyance passage toward the spheres 80 (i.e., in an upward direction in FIG. 26) around the spheres 80. With the inclined face 84 formed on the upstream side from the spheres 80 (i.e., the right side of FIG. 26), the leading end of the sheet P can smoothly climb on the spheres 80. Accordingly, an angular displacement of the sheet P caused by contact (collision) of the leading end of the sheet P with the spheres 80 can be prevented, and an increase in angular displacement amount of the sheet P beyond the correctable range can be avoided. Further, since the inclined face 84 is located on the downstream side from the spheres 80 (i.e., the left side of FIG. 26), occurrence of noise caused by the trailing end of the sheet P flipping at the steps during sheet conveyance of a thick paper or at a high speed can be reduced. Therefore, quietness of the image forming apparatus 1 can be maintained.

In the configuration illustrated in FIG. 26, the inclined face 84 is integrally formed in the housing 81 but the configuration is not limited thereto. For example, an inclined face having the same function as the above-described inclined face 84 may be formed in a sheet conveyance guide. For example, when the sheet conveyance guide is a sheet metal, the edge of the opening 122 from which the sphere 80 is projected is bent to form an inclined face. Further, the inclined face 84 may be formed for each of the spheres 80. When multiple spheres 80 are aligned in the width direction at narrow intervals, the inclined face 84 may be formed consecutively in the width direction.

Further, an amount of projection of each of the spheres 80 to the sheet conveyance guide may be changeable. In the configuration illustrated in FIG. 27, a projecting amount changing mechanism 86 is provided to change an amount of projection A of each of the spheres 80 to the upper sheet conveyance guide 120*a*. The projecting amount changing mechanism 86 includes a slide member 88, a cam 90 and a motor 91. The slide member 88 slides a pillar-shaped or cylindrical guide 87 that is fixed to the frame of the image forming apparatus 1. The cam 90 causes the slide member 88 to slide against a biasing force applied by a spring 89. The motor 91 functions as a drive unit to drive the cam 90. The sphere units 83 is mounted on the slide member 88. As the slide member 88 slidably moves, the sphere 80 moves in a projecting direction to project from the upper sheet conveyance guide 120*a* and an opposite direction to the projecting direction. The motor 91 is a stepping motor. As the motor 91 rotates by a predetermined number of steps, the cam 90 is rotated by a predetermined angle from a home position (i.e., an initial position) detected by a home position sensor 92.

Figure 27:
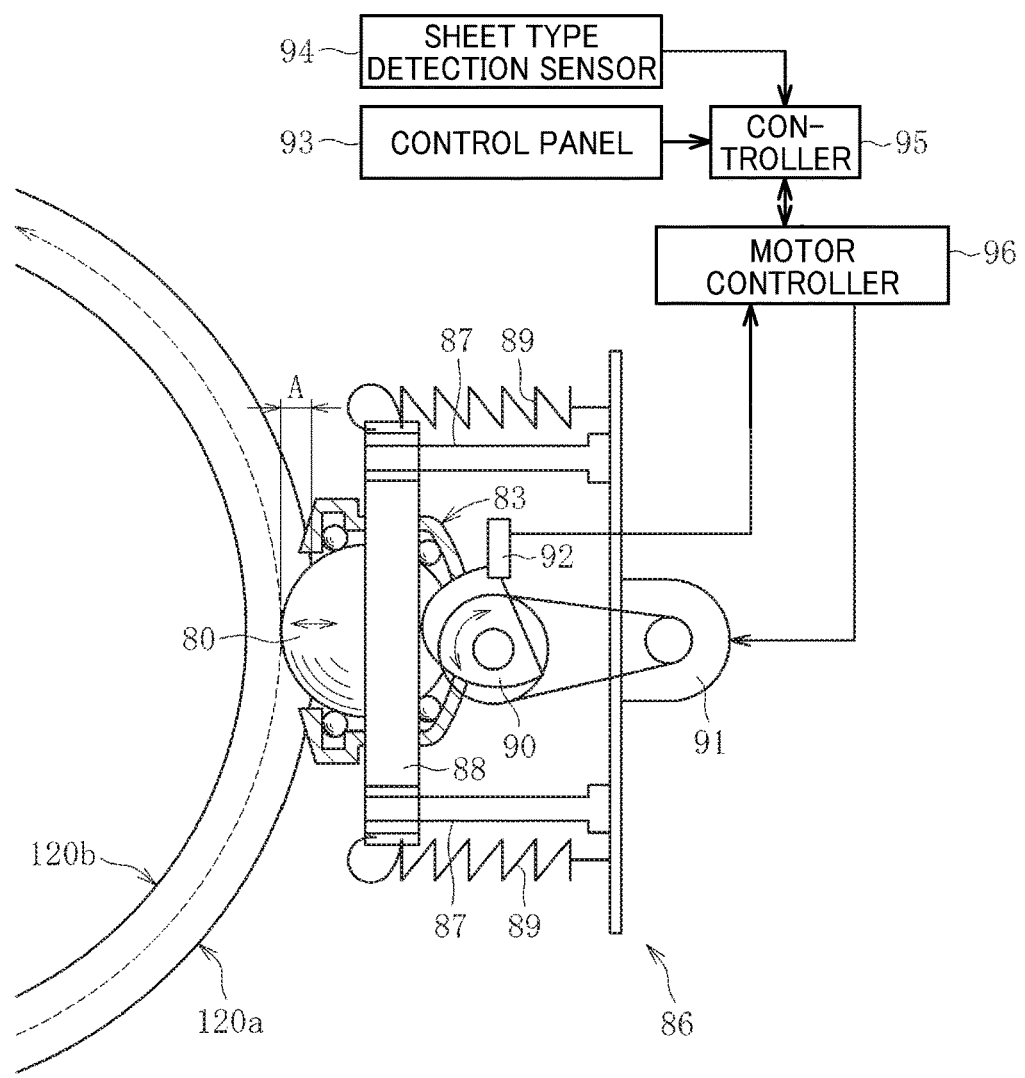
FIG. 27 is a diagram illustrating a configuration in which a protruding amount of the sphere is changeable.

As the cam 90 is rotated, the slide member 88 is pressed by the cam 90 toward the left side of FIG. 27. According to this action, the amount of projection A of the sphere 80 to the upper sheet conveyance guide 120*a* increases.

By contrast, as the cam 90 is rotated in the opposite direction, the slide member 88 is pulled by the biasing force of the spring 89 to the right side of FIG. 27. According to this action, the amount of projection A of the sphere 80 to the upper sheet conveyance guide 120*a* decreases.

Further, the projecting amount changing mechanism 86 adjusts the amount of projection A of the sphere 80 to a predetermined optimum amount, based on a sheet type (i.e., rigidity and thickness) inputted via a control panel 93 or a sheet type detected by a sheet type detection sensor 94 provided in the image forming apparatus 1. Information related to the sheet type input via the control panel 93 or detected by the sheet type detection sensor 94 is sent to a controller 95 that includes a central processing unit (CPU) provided to the image forming apparatus 1. The controller 95 issues instructions to a motor controller 96 based on the sheet type. By so doing, the motor 91 rotates by the predetermined number of steps to rotate the cam 90 by the predetermined angle. Accordingly, the amount of projection A of the sphere 80 is adjusted to an optimum amount to the sheet type.

For example, in a case in which the sheet is a thin paper having a thickness of 0.2 mm or smaller, a small amount of projection A can easily cause deformation at the leading end of the sheet due to the contact resistance with the spheres 80. Therefore, it is likely that the deformation at the leading end of the sheet leads to a decrease in precision of detection of a positional deviation of the sheet and a decrease in print quality of the sheet. Further, it is also likely that an additional angular displacement of the sheet is caused by contact (collision) of the leading end of the sheet with the spheres 80. For these reasons, in a case in which such a thin paper is conveyed, the spheres 80 are set not to project to the upper sheet conveyance guide 120*a* (i.e., the amount of projection A is 0 or a negative number). Then, after the leading end of the sheet has passed the position of the spheres 80, the spheres 80 may be set to project from the upper sheet conveyance guide 120*a*. Accordingly, deformation and an angular displacement of the sheet caused by contact (collision) of the leading end of the sheet with the spheres 80 can be prevented.

Further, the spheres 80 are caused to project at a timing before the start of the sheet position correction of the sheet. By so doing, the sheet can be conveyed smoothly by the spheres 80 during the sheet position correction.

It is to be noted that the timing that the leading end of the sheet passes the position of the spheres 80 can be grasped by the sheet position detection sensors (i.e., the first CIS 100, the second CIS 101 and the third CIS 102) provided in the sheet conveyance passage.

A single sphere unit 83 is illustrated in FIG. 27. However, multiple sphere units 83 may be mounted on the slide member 88. By so doing, respective amounts of projections A can be changed simultaneously. Further, the projecting amount changing mechanism 86 illustrated in FIG. 27 may be provided to multiple spheres 80 or multiple sphere arrays. Further, in this case, multiple cams 90 may be rotated by a single motor 91 by using gears and timing belts. By so doing, the multiple spheres 80 or the multiple sphere arrays can be shifted by the same amount simultaneously.

Figure 28A:
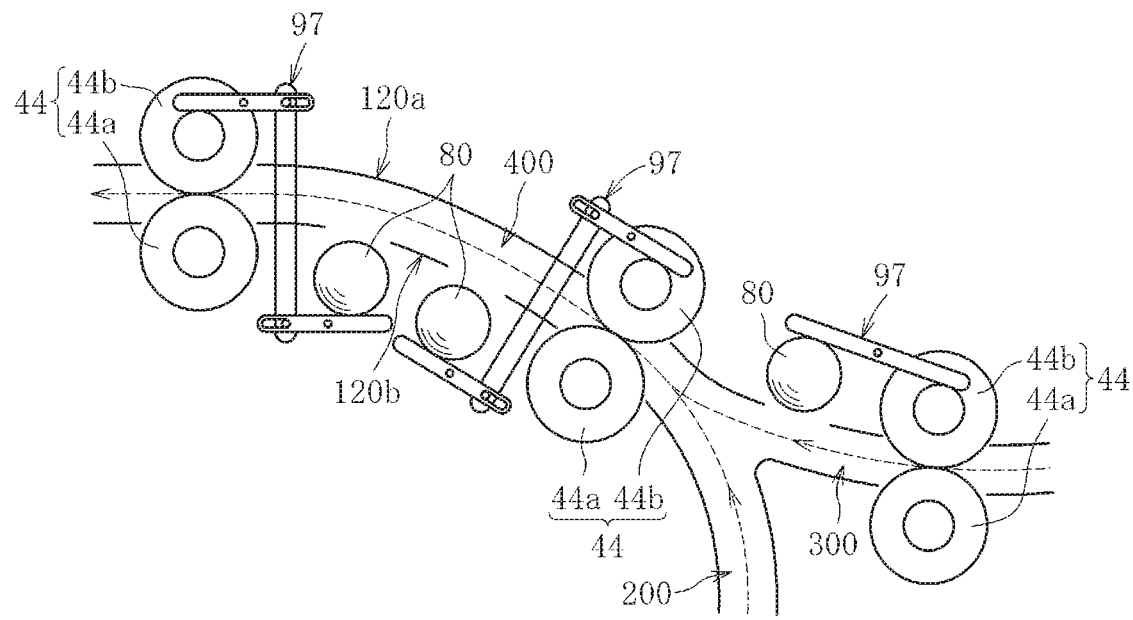
FIG. 28A is a diagram illustrating a configuration in which the spheres are not projected in connection to a contact state of a contacting and separating operation of a pair of sheet conveying rollers.
Figure 28B:
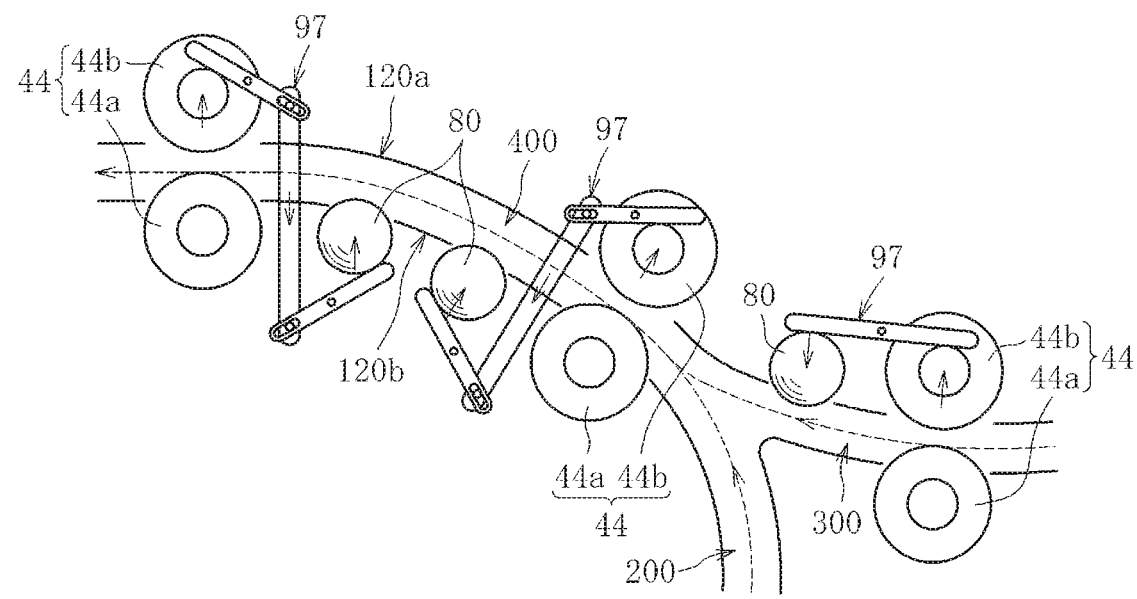
FIG. 28B is a diagram illustrating the configuration in which the spheres are projected in connection to a separation state of the contacting and separating operation of the pair of sheet conveying rollers.
Figure 29:
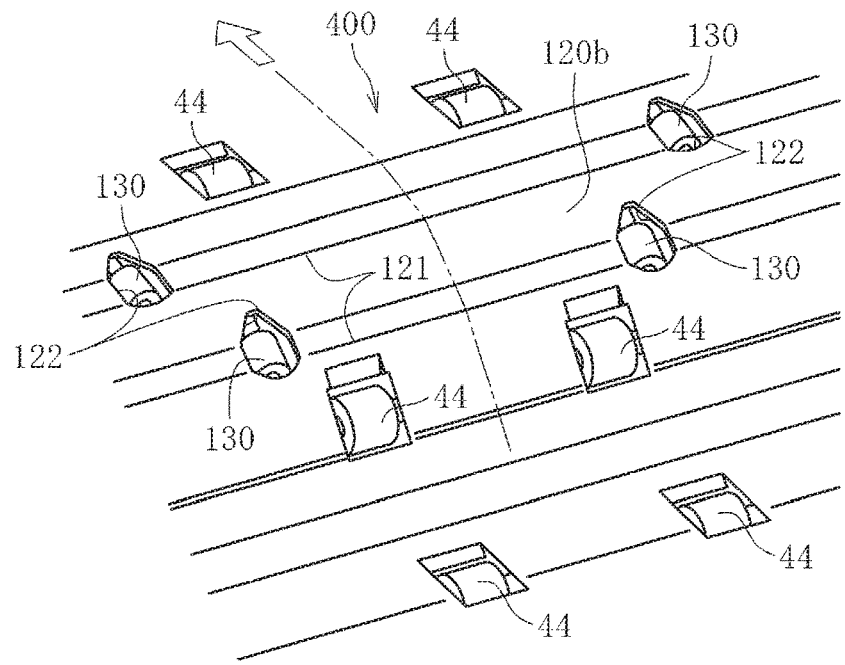
FIG. 29 is a diagram illustrating a configuration that employs rollers as a contact resistance reducer.

In a configuration illustrated in FIGS. 28A and 28B, a projecting operation of the spheres 80 to the lower sheet conveyance guide 120*b* is linked to a separating operation of the pair of sheet conveying rollers 44. In this configuration, a link mechanism 97 is provided to cause the spheres 80 to link the contacting and separating operations of the pair of sheet conveying rollers 44 (in this case, the contacting and separating operations of the driven roller 44*b* to the drive roller 44*a*).

As illustrated in FIG. 28A, in a state in which the drive roller 44*a* and the driven roller 44*b* of the pair of sheet conveying rollers 44 contact to each other, the spheres 80 are held in a non-projecting state without being projected to an upward direction (toward the sheet conveyance passage) from the lower sheet conveyance guide 120*b*. From the above-described state, as the drive roller 44*a* and the driven roller 44*b* of the pair of sheet conveying rollers 44 separate from each other, as illustrated in FIG. 28B, the link mechanism 97 moves along with the separating operation. With this separating operation, the positions of the spheres 80 are switched to a projecting state to be projected from the lower sheet conveyance guide 120*b* to the upward direction. After the pair of sheet conveying rollers 44 has returned to the state in which the drive roller 44*a* and the driven roller 44*b* contact to each other, the spheres 80 are returned to the non-projecting state where the spheres 80 are not projected from the lower sheet conveyance guide 120*b* (as illustrated in FIG. 28A).

Thus, the spheres 80 are switched between the projecting state and the non-projecting state along with the contacting and separating operations of the pair of sheet conveying rollers 44. Accordingly, a simpler configuration and a reduction in size of the image forming apparatus 1 can be achieved. That is, since a drive source to cause the spheres 80 to project can also cause the two rollers of the pair of sheet conveying rollers 44 to separate from each other, no additional drive source dedicated to cause the spheres 80 to project is provided.

Further, similar to the configuration of FIG. 27, this configuration can avoid a contact (collision) of the leading end of the sheet to the spheres 80 by leaving the spheres 80 in the non-projecting state where the spheres 80 do not project to the lower sheet conveyance guide 120*b* until the leading end of the sheet passes the position of the spheres 80.

Further, after the leading end of the sheet has passed the position of the spheres 80, the two rollers of the pair of sheet conveying rollers 44 separate from each other at the timing prior to the sheet position correction. Along with the separating operation of the two rollers of the pair of sheet conveying rollers 44, the spheres 80 are switched to the projecting state, and therefore the sheet can be conveyed smoothly by the spheres 80 during the sheet position correction.

In the above-described configuration, the spheres 80 that are rotatable in any direction are employed as a rolling body or rolling bodies to which the sheet contacts to rotate. However, the configuration of the rolling body is not limited thereto and any rolling body other than the spheres 80 can be applied. For example, in a configuration in which the sheet is moved in the width direction alone to correct the position of the sheet, rollers 130 each of which is rotatable in the width direction are employed as a rolling body or rolling bodies. In this case, as the sheet contacts the rollers 130, the sheet can smoothly move in the width direction. Accordingly, the following performance of the sheet to the sheet position correction can be enhanced.

Further, these rollers 130 have a significantly limited rotation direction compared to the spheres 80. However, the rollers 130 that are rotatable in the width direction may be employed not only to a sheet conveying device that performs the lateral displacement correction of the sheet alone but also to a sheet conveying device that performs both the lateral displacement correction and the angular displacement correction of the sheet or a sheet conveying device that performs the angular displacement correction of the sheet alone. Also in this case, in order to move the sheet in the width direction smoothly, it is expected to some extent that the following performance of the sheet to the sheet position correction is enhanced.

It is to be noted that the rotation direction of the rollers 130 is not limited to the direction perpendicular to the sheet conveying direction but can be set to any direction as long as it is the width direction intersecting the sheet conveying direction.

Further, it is needless to say but the spheres 80 can be applied not only to a sheet conveying device that performs both the lateral and angular displacement corrections of the sheet as described above but also to a sheet conveying device that performs the lateral displacement correction of the sheet alone or a sheet conveying device that performs the angular displacement correction of the sheet alone.

Now, a description is given of a configuration employing a contact resistance reducer other than the rolling body.

Figure 30:
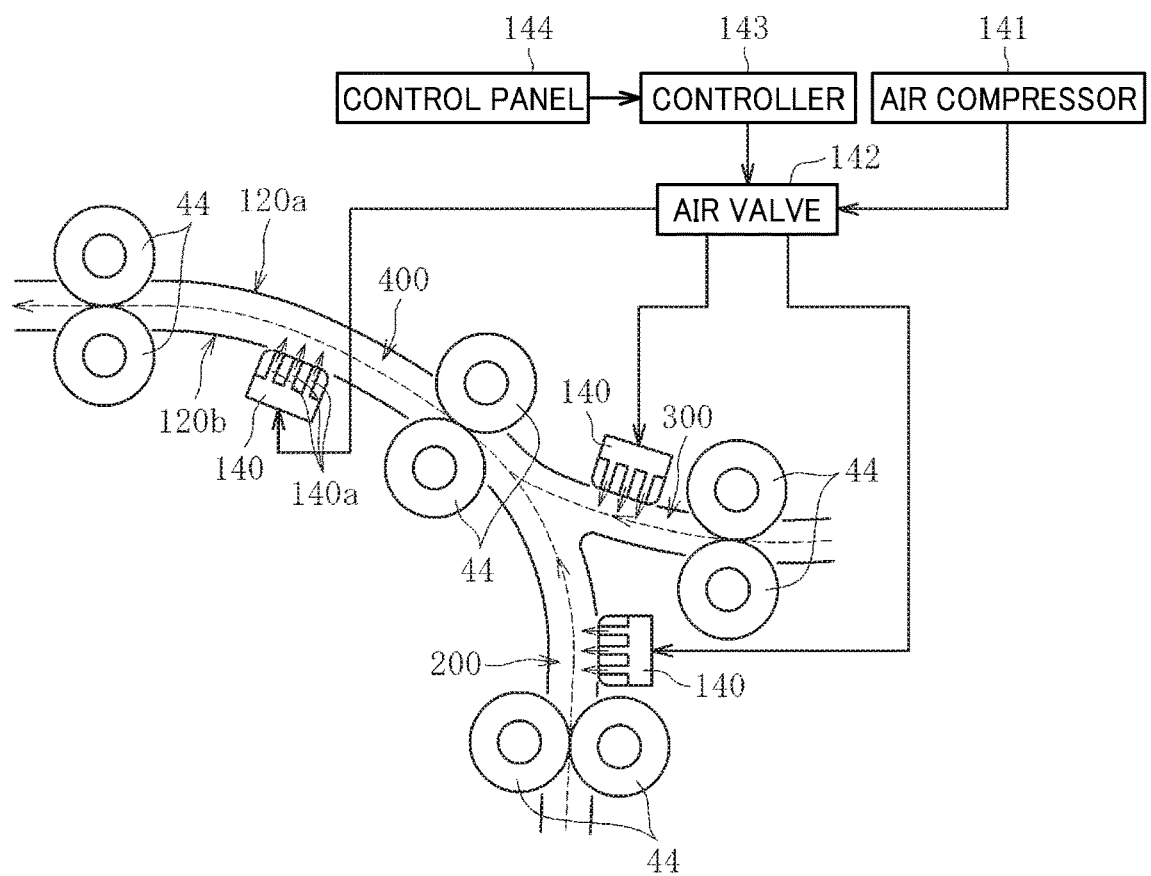
FIG. 30 is a diagram illustrating a configuration that employs air blowers as a contact resistance reducer.

FIG. 30 is a diagram illustrating a configuration that employs air blowers as contact resistance reducers.

In the configuration of FIG. 30, air blowers 140 are disposed as contact resistance reducers to blow air to the sheet conveyance passage. Each of the air blowers 140 has multiple significantly small air blow openings 140a. Each of the multiple air blow openings 140a is provided to slightly project more than the upper sheet conveyance guide 120a and the lower sheet conveyance guide 120b, from respective openings provided to the upper sheet conveyance guide 120a and the lower sheet conveyance guide 120b toward the sheet conveyance passage. Air is blown to the air blowers 140 from an air compressor 141 that functions as an air supplier. The air supplied to the air blowers 140 is blown from the multiple air blow openings 140a toward the sheet conveyance passage.

In the configuration of FIG. 30, the respective air blowers 140 are disposed to the first curved portion 200, the second curved portion 300 and the third curved portion 400. However, similar to the above-described rolling body, the air blowers 140 may be disposed by selecting a position or positions out of the first curved portion 200, the second curved portion 300 and the third curved portion 400.

Further, it is preferable that the air blowers 140 are disposed over the entire width direction to cover the width of the sheet having each size to be used.

As described above, the air blowers 140 are disposed in the first curved portion 200, the second curved portion 300 and the third curved portion 400. Therefore, when the sheet is conveyed to the first curved portion 200, the second curved portion 300 and the third curved portion 400, the contact resistance generated between the sheet and the upper sheet conveyance guide 120a and the lower sheet conveyance guide 120b can be reduced by air blown from the air blowers 140. Specifically, since the air blown from the air blowers 140 (i.e., airflow) flows and resides between the sheet and the upper sheet conveyance guide 120a and the lower sheet conveyance guide 120b, the sheet slightly floats up from (i.e., separates from) the upper sheet conveyance guide 120a and the lower sheet conveyance guide 120b. Therefore, the contact resistance between the sheet and the upper sheet conveyance guide 120a and the lower sheet conveyance guide 120b can be reduced. Accordingly, the contact resistances in the sheet conveying direction and any directions perpendicular to the sheet conveying direction are reduced, and the following performance of the sheet to the sheet position correction is enhanced, and therefore the sheet position correction can be performed with higher accuracy.

Further, the configuration employing the air blowers 140 as illustrated in FIG. 30 includes an air valve 142 and a controller 143. The air valve 142 functions as an air blowing amount adjuster to adjust the amount (strength) of air blown from the air compressor 141. The controller 143 controls the air based on a sheet type (rigidity and thickness) input by a user via the control panel 144. According to this configuration, the air valve 142 changes the amount of opening of an air flow passage based on the inputted sheet type and adjusts the amount of air to be blown from the air blowers 140.

As described above, the controller 143 controls the air valve 142 based on the sheet type. Therefore, the amount of air blown from the air blowers 140 (i.e., the strength of air blow) can be adjusted to be an optimum amount (strength) of air blow for each sheet type. Generally, a thicker sheet having higher rigidity is highly likely to contact a neighboring part or parts such as a sheet conveyance guide. Therefore, by increasing the amount (strength) of air blow when conveying this type of sheet, the sheet is caused to float from the sheet conveyance guide reliably, so that the contact resistance can be reduced.

Figure 31:
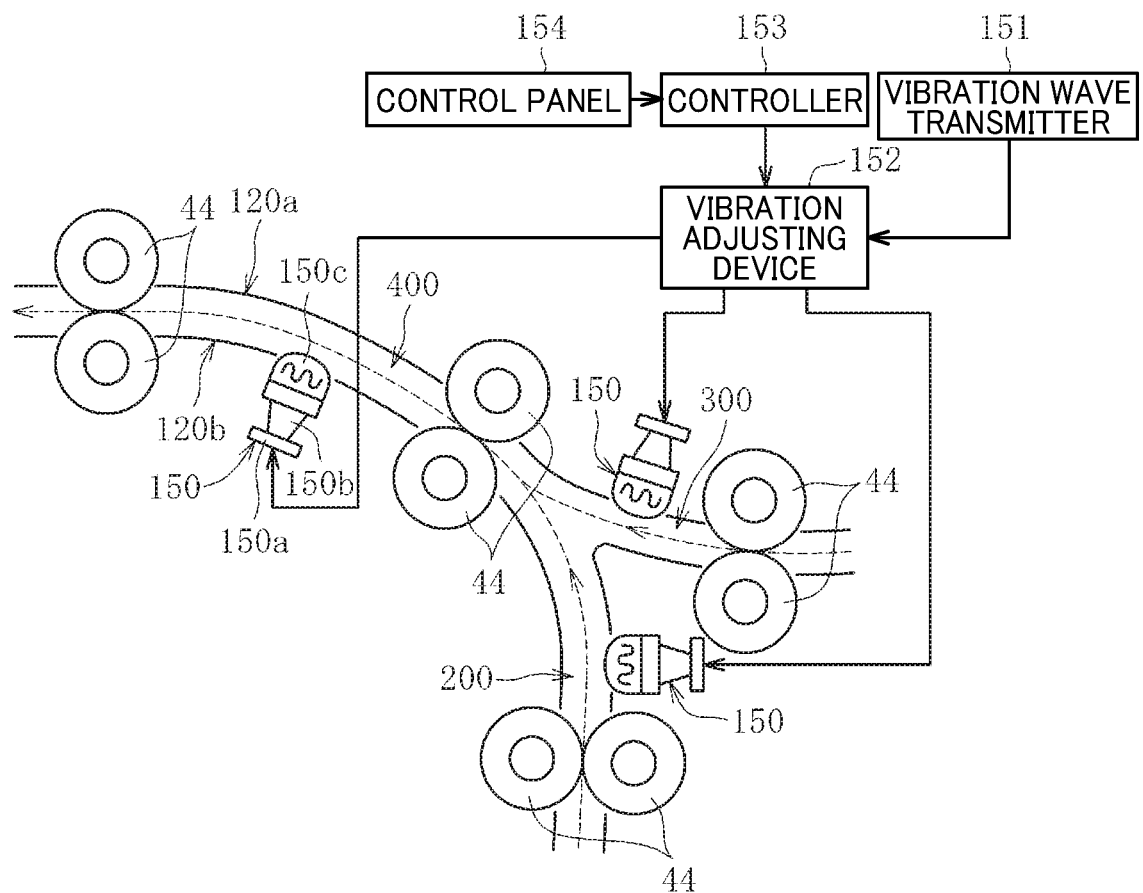
FIG. 31 is a diagram illustrating a configuration that employs vibration appliers as a contact resistance reducer.

Next, a configuration illustrated in FIG. 31 includes vibration appliers 150 as contact resistance reducers to apply vibration to the sheet.

Each of the vibration appliers 150 illustrated in FIG. 31 includes an oscillator 150a, a horn 150b and a vibration portion 150c. The oscillator 150a includes piezo element (i.e., piezoelectric element) vibrated by a vibration wave transmitter 151. Further, the oscillator 150a is joined by the horn 150b made by stainless steel, so that the horn 150b amplifies the vibration of the oscillator 150a. Further, the horn 150b is joined by the vibration portion 150c. The vibration amplified by the horn 150b is transmitted to the vibration portion 150c, thereby vibrating the vibration portion 150c. The vibration portions 150c are provided to project from respective openings formed in the upper sheet conveyance guide 120a and the lower sheet conveyance guide 120b toward the sheet conveyance passage, slightly greater than the upper sheet conveyance guide 120a and the lower sheet conveyance guide 120b.

In the configuration of FIG. 31, the respective vibration appliers 150 are disposed to the first curved portion 200, the second curved portion 300 and the third curved portion 400. However, similar to the above-described rolling bodies and the above-described air blowers 140, the vibration appliers 150 may be disposed by selecting a position or positions out of the first curved portion 200, the second curved portion 300 and the third curved portion 400. Further, it is preferable that multiple vibration appliers 150 are disposed over the entire width direction of the sheet conveyance passage so that the multiple vibration appliers 150 can apply vibration in a range corresponding to the width of the sheet conveyance passage through which a sheet having each size to be used passes.

As described above, the vibration appliers 150 are disposed in the first curved portion 200, the second curved portion 300 and the third curved portion 400. Therefore, when the sheet is conveyed to the first curved portion 200, the second curved portion 300 and the third curved portion 400, the sheet contacts the vibration appliers 150, which causes vibration, and the contact resistance generated between the sheet and the upper sheet conveyance guide 120a and the lower sheet conveyance guide 120b can be reduced by vibration applied by the vibration appliers 150. Specifically, since the sheet vibrates, the sheet slightly floats up from (i.e., separates from) the upper sheet conveyance guide 120a and the lower sheet conveyance guide 120b. Therefore, the contact resistance between the sheet and the upper sheet conveyance guide 120a and the lower sheet conveyance guide 120b can be reduced. Accordingly, the contact resistances in the sheet conveying direction and any directions perpendicular to the sheet conveying direction are reduced, and the following performance of the sheet to the sheet position correction is enhanced, and therefore the sheet position correction can be performed with higher accuracy.

Further, the configuration employing the vibration appliers 150 as illustrated in FIG. 31 includes a vibration adjusting device 152 and a controller 153. The vibration adjusting device 152 adjusts the frequency and amplitude of a vibration wave generated by the vibration appliers 150. The controller 153 controls the vibration adjusting device 152 based on a sheet type (rigidity and thickness) input by a user via the control panel 154. According to this configuration, the vibration adjusting device 152 adjusts the frequency and amplitude of a vibration wave based on the inputted sheet type.

As described above, the controller 153 controls the vibration adjusting device 152 based on the sheet type. Therefore, the frequency and amplitude of a vibration wave generated by the vibration appliers 150 can be adjusted to be an optimum amount for each sheet type. A vibration wave generated by the vibration appliers 150 has the frequency in a range of from 40 KHz to 60 KHz and the amplitude in a range of from 15 µm to 30 µm. By adjusting the frequency and amplitude of a thicker sheet having higher rigidity, the sheet is caused to float from the sheet conveyance guide reliably, so that the contact resistance can be reduced.

As described above, any of the spheres 80, the rollers 130, the air blowers 140 and vibration appliers 150 may be applied to the contact resistance reducer provided to the sheet conveying device 30 according to this disclosure. However, the configuration of the contact resistance reducer according to this disclosure is not limited thereto. It will be obvious to those skilled in the art that various changes may be made without departing from the scope and spirit of this disclosure.

In the above-described configurations, the contact resistance reducer is disposed at the curved portion. The curved portion is not limited to a portion having continuously curved lines but may be a combination of multiple continuous lines having different angles from each other via a bent portion (a corner) or a combination of multiple curved lines and multiple straight lines.

Figure 32:
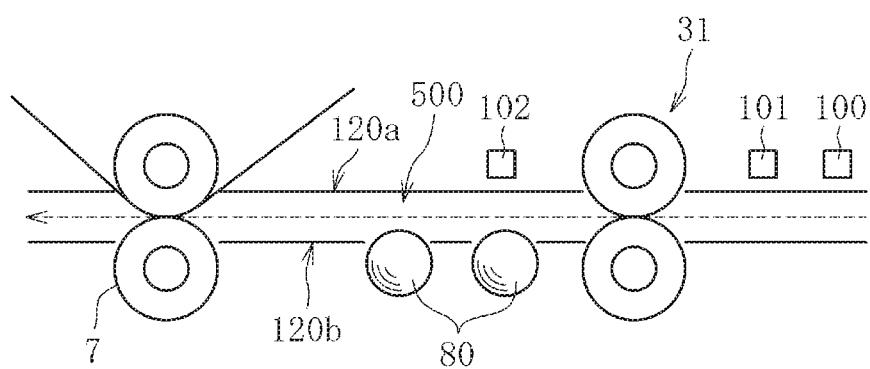
FIG. 32 is a diagram illustrating a configuration in which the spheres are disposed in a straight sheet conveying passage that is downstream from the pair of sheet holding rollers in a sheet conveying direction.

Further, in the above-described configurations, the contact resistance reducer is disposed at the curved portion on the upstream side from the pair of sheet holding rollers 31 in the sheet conveying direction. However, the location of the contact resistance reducer is not limited thereto but may be disposed on the downstream side from the pair of sheet holding rollers 31 in the sheet conveying direction or disposed to a straight sheet conveyance passage. For example, when the spheres 80 are used as a contact resistance reducer, the spheres 80 may be disposed to the straight sheet conveyance passage 500 extending between the pair of sheet holding rollers 31 and the secondary transfer portion 7, as illustrated in FIG. 32. As in the image forming apparatus 1, in the configuration in which the sheet position correction (i.e., the secondary correction) is performed even after the leading end of the sheet has passed the pair of sheet holding rollers 31, the contact resistance is likely to be generated to the leading end of the sheet in the straight sheet conveyance passage 500 during the sheet position correction. In order to avoid this inconvenience, the spheres 80 are disposed to the straight sheet conveyance passage 500 as illustrated in FIG. 32. By so doing, the sheet can move smoothly, and therefore the following performance of the sheet to the position correction can be enhanced.

Further, in the above-described configurations, the sheet conveying device that conveys a sheet or sheets is applied to this disclosure. However, the configuration applicable to this disclosure is not limited thereto. For example, this disclosure can be applied to a sheet conveying device that conveys recording media such as overhead projector (OHP) sheets and overhead projector (OHP) films on which an image is formed or sheets such as original documents, as well as a sheet conveying device that conveys sheets including plain papers, thick papers, thin papers, coated papers, label papers and envelopes. Further, this disclosure can be applied to not only a sheet conveying device that conveys a recording medium and a sheet such as an original document but also a sheet conveying device that conveys a conveyance target medium such as a printed circuit board.

Further, the sheet conveying device 30 according to this disclosure is employed to the color image forming apparatus 1 as illustrated in FIG. 1. However, the sheet conveying device that can be applied to this disclosure may be employed to a monochrome (black and white) image forming apparatus or an image forming apparatus other than an electrophotographic image forming apparatus, for example, such as an inkjet image forming apparatus and an offset printing machine.

Figure 33:
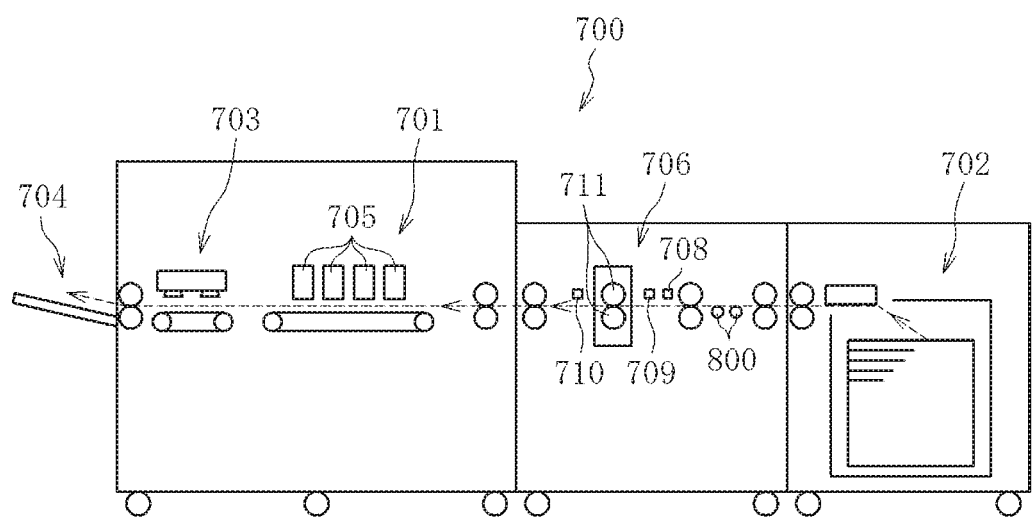
FIG. 33 is a schematic view illustrating a sheet conveying device employed in an inkjet image forming apparatus.

FIG. 33 is a schematic view illustrating a sheet conveying device employed in an inkjet image forming apparatus 700.

As illustrated in FIG. 33, the inkjet image forming apparatus 700 includes an image forming device 701, a sheet feeding device 702, a sheet conveying device 706, a drying device 703, and a sheet output device 704. The image forming device 701 includes multiple ink print heads 705 to discharge ink using an inkjet method. The sheet feeding device 702 feeds a sheet with an image formed thereon. The sheet conveying device 706 conveys the sheet. The drying device 703 dries the sheet with the image thereon. The sheet output device 704 ejects the sheet dried by the drying device 703. The sheet conveying device 706 includes multiple CISs 708, 709 and 710 and a pair of sheet holding rollers 711 in a sheet conveying passage extending from the sheet feeding device 702 to the image forming device 701. Each of the multiple CISs 708, 709 and 710 functions as a position detector to detect the position of the sheet. The pair of sheet holding rollers 711 functions as a position corrector to correct the position of the sheet based on detection results obtained by the multiple CISs 708, 709 and 710. The pair of sheet holding rollers 711, while conveying the sheet fed by the sheet feeding device 702, corrects the lateral and angular displacements of the sheet based on the detection results of the multiple CISs 708, 709 and 710. Thereafter, the sheet is conveyed to the image forming device 701. Consequently, respective color ink is discharged from the ink print heads 705 to the sheet in the image forming device 701, thereby forming an image on a surface of the sheet. After having been dried by the drying device 703, the sheet is ejected to the sheet output device 704.

In the inkjet image forming apparatus 700 described above, the contact resistance is generated when the sheet contacts a neighboring part or parts such as the sheet conveyance guide during the sheet position correction, Therefore, similar to the above-described configurations, it is preferable that the inkjet image forming apparatus 700 includes a contact resistance reducer 800 (for example, the spheres 80, the rollers 130, the air blowers 140 or the vibration appliers 150) in one or both of an upstream side sheet conveyance passage and a downstream side sheet conveyance passage from the pair of sheet holding rollers 711 in the sheet conveying direction. According to this configuration, the sheet can move smoothly during the sheet position correction, and therefore the following performance of the sheet to the sheet position correction can be enhanced.

Further, the sheet conveying device according to this disclosure can be applied to a post processing device that performs post processing to a sheet output from an image forming apparatus.

Figure 34:
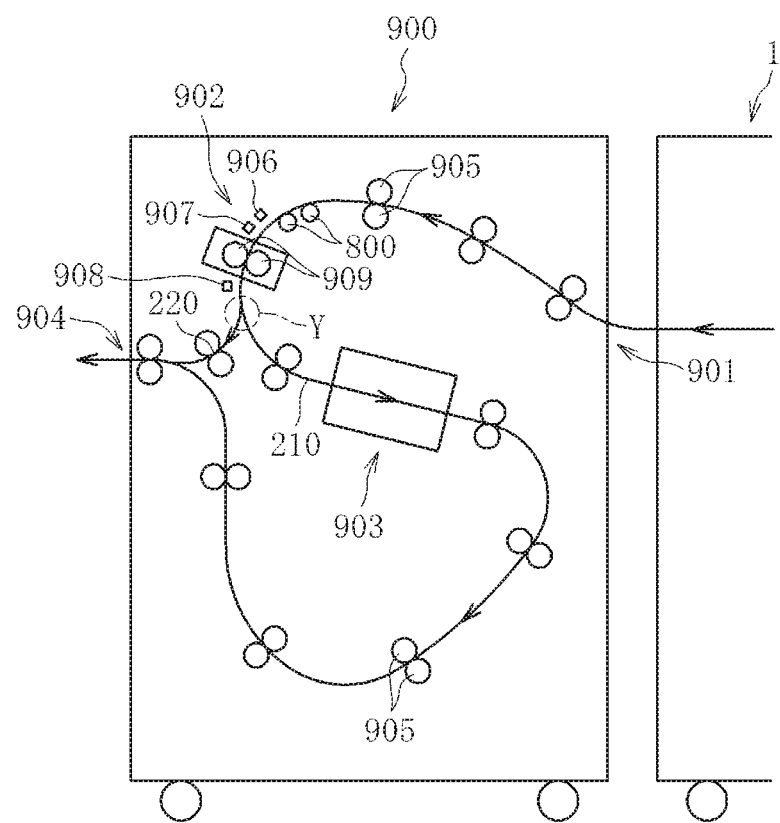
FIG. 34 is a schematic diagram illustrating an entire configuration of a post processing device.

FIG. 34 is a schematic diagram illustrating an entire configuration of a post processing device 900 including a sheet conveying device according to this disclosure.

The post processing device 900 illustrated in FIG. 34 includes a sheet receiving device 901, a sheet conveying device 902, a finishing device 903 and a sheet output device 904. The sheet receiving device 901 receives the sheet output from the image forming apparatus 1. The sheet conveying device 902 conveys the sheet received by the sheet conveying device 902. The finishing device 903 performs various finishing processes including a center folding process, a binding process and a punching process to the sheet. The sheet output device 904 ejects the sheet from the post processing device 900.

The sheet received via the sheet receiving device 901 into the post processing device 900 is conveyed by multiple pairs of sheet conveying rollers (multiple pairs of sheet conveying bodies) 905 included in the sheet conveying device 902 to either one of a first sheet conveyance passage 210 that passes through the finishing device 903 and a second sheet conveyance passage 220 that leads to the sheet output device 904 without passing through the finishing device 903. Further, the sheet conveying device 902 includes multiple CISs 906, 907 and 908 and a pair of sheet holding rollers 909. The multiple CISs 906, 907 and 908 are disposed on the upstream side of a branching portion Y at which the first sheet conveyance passage 210 and the second sheet conveyance passage 220 separate into different passage. Each of the multiple CISs 906, 907 and 908 functions as a position detector to detect the position of the sheet. The pair of sheet holding rollers 909 functions as a position corrector to correct the position of the sheet based on detection results obtained by the multiple CISs 906, 907 and 908. The pair of sheet holding rollers 909, while conveying the sheet, corrects the lateral displacement or the angular displacement of the sheet based on the detection results of the multiple CISs 906, 907 and 908. Thereafter, the sheet is conveyed to either one of the first sheet conveyance passage 210 and the second sheet conveyance passage 220.

In the post processing device 900 described above, when the sheet position correction is performed by the pair of sheet holding rollers 909, a contact resistance is generated when the sheet contacts a neighboring part or parts such as a sheet conveyance guide during the sheet position correction. Specifically, it is highly likely that a contact resistance is generated in a case in which the pair of sheet holding rollers 909 is disposed to a curved portion of the sheet conveyance passage in the post processing device 900. In order to avoid this inconvenience, similar to the above-described image forming apparatuses, it is preferable that the post processing device 900 illustrated in FIG. 34 includes the contact resistance reducer 800 (for example, the spheres 80, the rollers 130, the air blowers 140 or the vibration appliers 150) in one or both of an upstream side sheet conveyance passage and a downstream side sheet conveyance passage from the pair of sheet holding rollers 909. According to this configuration, the sheet can move smoothly during the sheet position correction, and therefore the following performance of the sheet to the sheet position correction can be enhanced.

The above-described embodiments are illustrative and do not limit this disclosure. Thus, numerous additional modifications and variations are possible in light of the above teachings. For example, elements at least one of features of different illustrative and exemplary embodiments herein may be combined with each other at least one of substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of this disclosure may be practiced otherwise than as specifically described herein.

What is claimed is:

1. A sheet conveying device comprising:
   a position corrector configured to convey a sheet and correct a position of the sheet;
   a rolling body disposed at least one of an upstream side and a downstream side of a sheet conveyance passage from the position corrector in a sheet conveying direction and configured to roll in at least a direction intersecting the sheet conveying direction; and
   a conveyance guide configured to guide the sheet to be conveyed,
   wherein the rolling body is disposed projecting from the conveyance guide toward the sheet conveyance passage,
   wherein the rolling body is switchable between a projecting state in which the rolling body is projected from the conveyance guide toward the sheet conveyance passage and a non-projecting state in which the rolling body is not projected from the conveyance guide toward the sheet conveyance passage, and
   wherein, after a leading end of the sheet in the sheet conveying direction has passed a position of the rolling body, prior to a timing at which the position corrector corrects the position of the sheet, the rolling body is switched to the projecting state.

2. The sheet conveying device according to claim 1, wherein the rolling body is a sphere configured to roll in the sheet conveying direction and each direction intersecting the sheet conveying direction.

3. The sheet conveying device according to claim 1, wherein an amount of projection of the rolling body toward the conveyance guide is changeable.

4. The sheet conveying device according to claim 1, further comprising:
   a pair of conveying rollers having two rollers separatably contacted to each other, the pair of conveying rollers configured to convey the sheet at an upstream side from the position corrector in the sheet conveying direction; and
   a link configured to switch the rolling body to the projecting state along with separation of the two rollers of the pair of conveying rollers.

5. The sheet conveying device according to claim 1, further comprising an inclined face configured to tilt to the sheet conveyance passage toward the rolling body.

6. The sheet conveying device according to claim 1, further comprising a position detector configured to detect the position of the sheet,
   wherein the position corrector is configured to correct the position of the sheet based on a detection result obtained by the position detector.

7. An image forming apparatus comprising the sheet conveying device according to claim 1.

8. A post processing device comprising the sheet conveying device according to claim 1.

9. The sheet conveying device according to claim 1, wherein the sheet conveyance passage has a curved portion at which the rolling body is disposed.

10. The sheet conveying device according to claim 1,
    wherein the position corrector includes at least one sheet holding roller,
    wherein the rolling body is at a curve in the sheet conveyance passage, and wherein the rolling body is configured to roll at the curve in at least a direction intersecting the sheet conveying direction.

11. A sheet conveying device comprising:
a position corrector configured to convey a sheet and correct a position of the sheet;
a contact resistance reducer configured to reduce contact resistance generated due to contact of the sheet to a neighboring part when the position of the sheet is corrected by the position corrector; and
a conveyance guide configured to guide the sheet to be conveyed,
wherein the contact resistance reducer is disposed projecting from the conveyance guide toward a sheet conveyance passage,
wherein the contact resistance reducer is switchable between a projecting state in which the contact resistance reducer is projected from the conveyance guide toward the sheet conveyance passage and a non-projecting state in which the contact resistance reducer is not projected from the conveyance guide toward the sheet conveyance passage, and
wherein, after a leading end of the sheet in the sheet conveying direction has passed a position of the contact resistance reducer, prior to a timing at which the position corrector corrects the position of the sheet, the contact resistance reducer is switched to the projecting state.

12. The sheet conveying device according to claim 11, wherein the contact resistance reducer is an air blower configured to blow air to an area between the sheet and the neighboring part of a curve in the sheet conveyance passage.

13. The sheet conveying device according to claim 11, wherein the contact resistance reducer is a vibration applier configured to apply vibration to the sheet.

14. The sheet conveying device according to claim 11, further comprising a position detector configured to detect the position of the sheet,
wherein the position corrector is configured to correct the position of the sheet based on a detection result obtained by the position detector.

15. An image forming apparatus comprising the sheet conveying device according to claim 11.

16. A post processing device comprising the sheet conveying device according to claim 11.

17. The sheet conveying device according to claim 11, wherein the contact resistance reducer is a sphere configured to rotate in the sheet conveying direction and each direction intersecting the sheet conveying direction.

18. The sheet conveying device according to claim 11, wherein the contact resistance reducer is a roller configured to rotate in a direction intersecting the sheet conveying direction.

19. The sheet conveying device according to claim 11, wherein the contact resistance reducer includes at least one contact reducing roller disposed at a curve in the sheet conveying passage that is oriented to roll at the curve in a direction intersecting the sheet conveying direction.

20. A sheet conveying device comprising:
a sheet conveyance passage oriented in a sheet conveying direction;
a holding roller disposed at least one of an upstream side and a downstream side of the sheet conveyance passage and configured to convey a sheet in the sheet conveying direction while correcting a position of the sheet;
a contact resistance reducing rolling body at a curve in the sheet conveyance passage that is configured to roll at the curve in at least a direction intersecting the sheet conveying direction while the holding roller corrects the position of the sheet; and
a conveyance guide configured to guide the sheet to be conveyed,
wherein the contact resistance reducing rolling body is disposed projecting from the conveyance guide toward the sheet conveyance passage,
wherein the contact resistance reducing rolling body is switchable between a projecting state in which the contact resistance reducing rolling body is projected from the conveyance guide toward the sheet conveyance passage and a non-projecting state in which the contact resistance reducing rolling body is not projected from the conveyance guide toward the sheet conveyance passage, and
wherein, after a leading end of the sheet in the sheet conveying direction has passed a position of the contact resistance reducing rolling body, prior to a timing at which the holding roller corrects the position of the sheet, the contact resistance reducing rolling body is switched to the projecting state.

* * * * *